United States Patent
Rasidescu et al.

(10) Patent No.: US 6,799,781 B2
(45) Date of Patent: Oct. 5, 2004

(54) FRAMES FOR ALL-TERRAIN VEHICLES

(75) Inventors: Mihai Rasidescu, Sherbrooke (CA); Daniel Mercier, Valcourt (CA)

(73) Assignee: Bombardier Recreational Products Inc., Saint-Bruno (CA)

(*) Notice: Subject to any disclaimer, the term of this patent is extended or adjusted under 35 U.S.C. 154(b) by 111 days.

(21) Appl. No.: 09/824,878

(22) Filed: Apr. 4, 2001

(65) Prior Publication Data

US 2002/0117843 A1 Aug. 29, 2002

Related U.S. Application Data

(63) Continuation-in-part of application No. 09/804,061, filed on Mar. 13, 2001, now abandoned
(60) Provisional application No. 60/189,053, filed on Mar. 14, 2000, and provisional application No. 60/188,697, filed on Mar. 13, 2000.

(51) Int. Cl.[7] .............................................. B62D 21/00
(52) U.S. Cl. ...................... 280/781; 180/311; 280/786; 280/787; 280/798
(58) Field of Search .................................. 180/311, 312, 180/210, 215, 219; 280/781, 786, 787, 798

(56) References Cited

U.S. PATENT DOCUMENTS

| | | | | |
|---|---|---|---|---|
| 3,521,904 A | * | 7/1970 | Sheffer | ........................ 180/219 |
| 3,698,502 A | * | 10/1972 | Patin | ........................... 180/215 |
| 4,623,167 A | * | 11/1986 | Matsubayashi et al. | ..... 280/798 |
| 4,735,275 A | * | 4/1988 | Tsukahara et al. | .......... 180/312 |
| 4,770,262 A | | 9/1988 | Yasunaga et al. | |
| 4,924,961 A | * | 5/1990 | Bernardi | ..................... 280/787 |
| 5,480,001 A | * | 1/1996 | Hara | .......................... 180/219 |
| 5,845,728 A | * | 12/1998 | Itoh et al. | ................... 180/219 |
| 5,845,918 A | * | 12/1998 | Grinde et al. | ............ 280/124.1 |
| 5,975,624 A | | 11/1999 | Rasidescu et al. | |
| 6,142,498 A | | 11/2000 | Smith | |
| 6,170,841 B1 | | 1/2001 | Mizuta | |
| 6,305,700 B1 | * | 10/2001 | Bruehl | ............... 280/124.135 |

FOREIGN PATENT DOCUMENTS

EP    0826584 B1    4/1998

OTHER PUBLICATIONS

Reinmech Sales Brochure Located May 25, 2000.
Suzuki LT–F160 Parts Catalog May 1997.

* cited by examiner

*Primary Examiner*—Eric Culbreth
(74) *Attorney, Agent, or Firm*—BRP Legal Services

(57) ABSTRACT

A frame for an ATV comprises a support module with a central opening defining an engine receiving space. The support module includes a first frame member and a second frame member with at least one cross member extending between the first and second frame members. At least a portion of the support module, which includes one of the frame members and the at least one cross member, consists essentially of a single beam. The single beam may be considered a modular central beam of the frame.

124 Claims, 22 Drawing Sheets

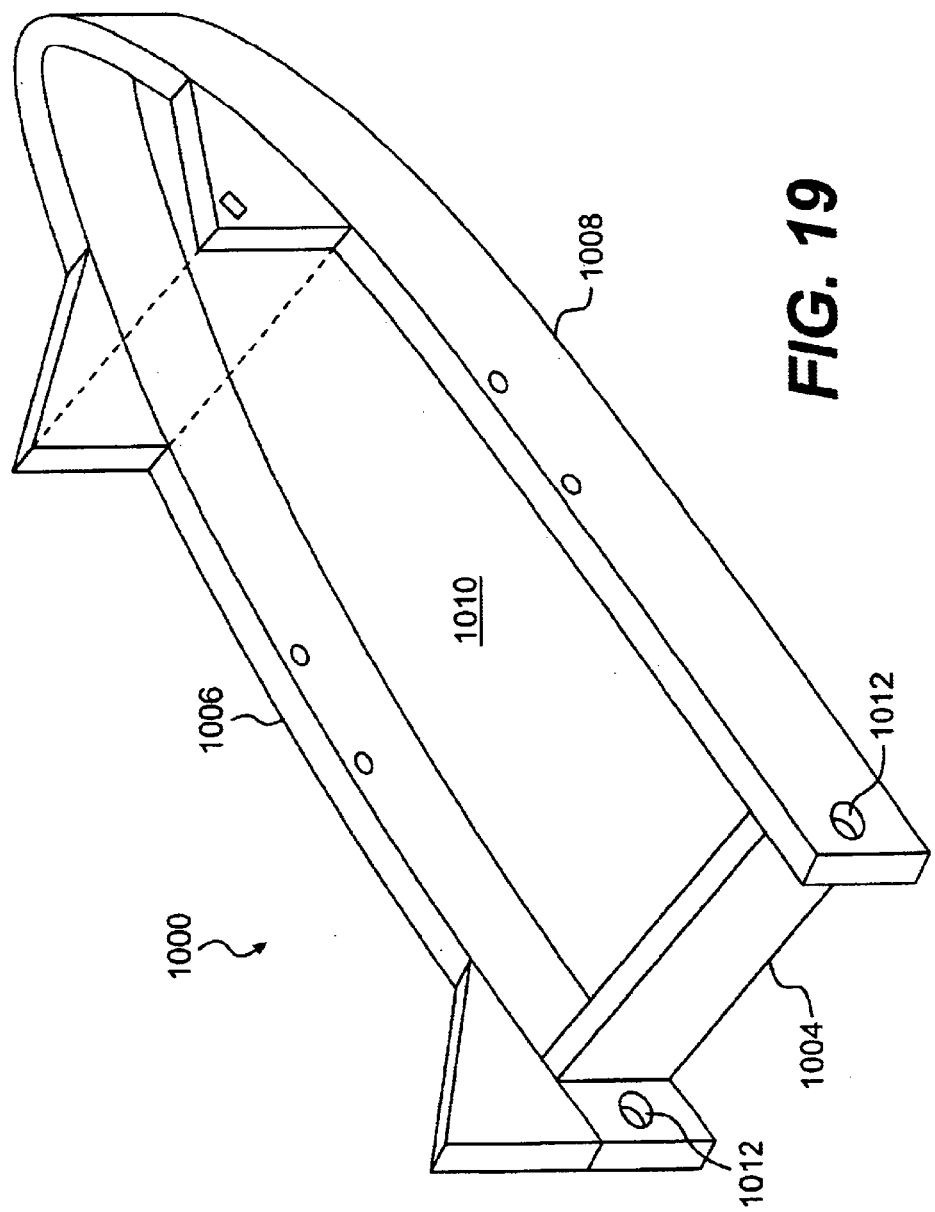

FRAMES FOR ALL-TERRAIN VEHICLES

CROSS REFERENCE TO RELATED APPLICATIONS

This application is a Continuation-In-Part of U.S. Non-Provisional Application Ser. No. 09/804,061 (filed Mar. 13, 2001) now abandoned, which in turn claims priority to U.S. Provisional Applications Ser. Nos. 60/188,697 (filed on Mar. 13, 2000) and 60/189,053 (filed on Mar. 14, 2000), incorporated herein by reference thereto.

FIELD OF THE INVENTION

The present invention relates to frames for vehicles and, more particularly, to a frame for an all terrain vehicle.

BACKGROUND OF THE INVENTION

All-terrain vehicles (ATV's) are designed to traverse relatively rough terrain. As ATV's have outboard wheels, meaning at least one wheel is spaced laterally outwardly from the frame, the frame is subjected to substantially high torsional loads, as well as bending loads (both static and dynamic in nature). As such, ATV's demand relatively high bending and torsional strengths of their frames. High strength requirements generally require a substantial measure of elasticity of the frame. However, the frame must also have a relative rigidity so as to not damage components of the ATV and maintaining good dynamic vehicle behavior. Therefore, the strength of the frame (which requires and introduces elasticity) must be balanced with the rigidity thereof.

Previous frames, sometimes referred to as "space" frames, have been constructed with sufficient strength and rigidity for ATV applications. However, to impart the necessary strength and rigidity properties and the balanced nature thereof, these frames have been either highly complex (and, as such costly to manufacture) or have used a large amount of material (also costly to manufacture and disadvantageously adding weight), or both (greatly increasing manufacturing costs).

As such, manufacturers of ATV's generally design ATV frames with a trade-off of high strength and rigidity for a relatively lower complexity/weight (cost). In other words, frames have been typically constructed to have substantially sufficient strength/rigidity properties (relatively, for ATV applications) with the lowest complexity and/or weight (cost) possible. It is possible to construct the frame with high strength metal alloys to increase strength properties of the frame without relatively increasing weight. However, of course, these metal alloys are highly costly and some require additional processing steps (such as post-weld heat treatment) in the manufacture of the frame.

It is also known to rigidly mount the engine to the frame in order to provide additional strength/rigidity properties to the frame (i.e., with the rigidity of the engine itself). However, the engine then directly transmits engine vibration to the frame, which can dramatically affect rider comfort. Steps have been taken to reduce or damp vibration of the engine, so as to improve rider comfort. However, it has proved extremely costly to substantially decrease engine vibration so that the frame is not adversely affected by the vibration of the engine. As such, it is generally accepted in the ATV art to resiliently mount the engine to the frame (such as with elastomeric bushings) so as to reduce transmission of engine vibration to the frame.

FIG. 1A shows a conventional space frame 800 for an ATV. This type of frame 800 generally includes a network of interconnected tubular members. As shown, the frame 800 is formed of spaced paired tubular members, such as upper members 802, 804 and lower members 806, 808. Additionally, the frame 800 includes multiple spaced paired cross members 810, 812 and 814, 816. Further, the frame 800 utilizes laterally extending cross members 818 between respective pairs of frame members. The frame 800 may demonstrate adequate strength properties for ATV application, however, as shown, demands a complex construction to do so.

The frame 800 utilizes a relatively complex plurality of tubular members (including the cross members), namely members 802–818. The frame 800 is mainly characterized in that it includes a large number of parts, for example, upwards of one hundred (100) components. The manufacturing process for producing this type of frame is relatively time consuming due to the complex layout of the members. Additionally, since there are a relatively high number of parts and welded joints, manufacturing time is further slowed. Also, there is a relatively higher statistical probability of forming a low quality weld and introducing dimensional distortions since the number of welds used to produce the frame 800 is relatively numerous. Moreover, some welds may be required to hold a relatively large number of parts in complicated shape. When the weld cools, it may shrink, thereby distorting the complicated shape.

FIG. 1B shows another conventional space frame 850. The frame 850 includes a spaced pair of upper tubular members 852, 854 and a spaced pair of lower tubular members 856, 858. The upper and lower members 852–858 are interconnected by respective spaced pairs of cross members 860, 862 and 864, 865. Further, similarly with the frame 800, respective pairs of the upper and lower members 852, 854 and 856, 858 are connected by laterally extending cross members 866 (connecting the upper members 852, 854) and cross members 868 (connecting the lower members 856, 858).

The frame 850 has several advantages over the frame 800. The main advantage is that the frame 850 uses only about half as many parts as the frame 800. Because there are less parts, the number of welds and interconnections is reduced, which in turn reduces the statistical probability of failure and the introduction of distortion.

The frame 850 reduces the number of parts by use of a connecting plate 870. The plate 870 replaces a plurality of components from the frame 800 by making the plurality of components a single integral unit. The plate 870 is connected between the lower members 856, 858 to thereby add additional rigidity between the lower members 856, 858. However, the plate 870 has little if any effect on the strength of the frame 850. Furthermore, the plate 870 allows various components of the ATV to be connected thereto. As such, additional connecting members need not be joined to the frame members and components of the ATV may be more easily joined to the frame 850. However, one disadvantage of the frame 850 is that it requires expensive tooling, especially for the plate 870.

Yet another conventional space frame 900 is shown in FIG. 1C. The frame 900 similarly includes upper frame members 902, 904 interconnected by laterally extending cross members 906 and lower members 908, 910, interconnected by laterally extending cross members 912. The upper members 902, 904 and lower members 908, 910 are interconnected by cross members 914.

The frame 900 includes corner brackets 916 to reduce magnitudes of stress concentrations formed between interconnected frame members, which adds weight and complexity to the frame 900. Further, the frame 900 includes a removably attachable rear frame section 920. As shown, the rear frame section 920 is attachable to the remainder of the frame 900 with a plurality of mechanical fasteners 922. The use of the rear frame section 920 allows the frame 900 to be constructed in a relatively decreased manufacturing time, since the frame may be constructed separately and in smaller sections and then joined separately, thus simplifying the manufacturing process. Further, because the frame 900 is a two part frame, field service in the event of failure can be improved. However, the connection of the rear frame section 920 is made with the mechanical fasteners 922, which may be prone to failure in harsh operating conditions.

As described above, frames for ATVs presently have sufficient relative bending and torsional strengths, however have been complex, time-consuming, and costly to manufacture. As such, there is a need in the art to provide a relatively simpler ATV frame that is easier and more cost-effective to manufacture and has the proper strength/rigidity requirements for ATV applications.

SUMMARY OF THE INVENTION

One aspect of the present invention is to provide a frame for an all-terrain vehicle.

Another aspect of the present invention is to provide a frame which does not require expensive tooling to manufacture.

Yet another aspect of the present invention is to provide a frame for an ATV with a reduced number of frame members.

A further aspect of the present invention is to provide a frame for an ATV that has a single frame member with a relatively larger sectional geometry in lieu of two or more frame members with respective relatively smaller sectional geometries.

An additional aspect of the present invention is to provide a frame for an ATV that is less expensive to manufacture.

Yet another aspect of the invention is to provide a frame with improved strength over a welded space frame without a corresponding increase in complexity, weight, and/or cost.

According to one exemplary embodiment of the invention, a frame for an ATV includes a first frame member, a second frame member, and at least a first cross member and a second cross member extending between the first and second frame members to thereby define a closed perimeter with an engine receiving space therein. The frame also includes first and second suspension mounting points associated with at least one of the first frame member, the second frame member, the first cross member, and the second cross member. At least one of the first frame member and the second frame member is positioned substantially along a longitudinal centerline of the frame and extends from the first suspension mounting point to the second suspension mounting point.

According to another exemplary embodiment of the invention, a frame for an ATV includes a support module with a central opening. The support module includes first and second longitudinal frame members interconnected by first and second cross members. Each of the first and second frame members consists essentially of a single beam.

According to still another preferred embodiment of the present invention, a frame for an ATV includes at least a first frame member and a second frame member interconnected to the second frame member to define an engine receiving space therebetween. At least one of the first frame member and the second frame member consists essentially of a single beam having a surface. The frame also includes at least one wheel suspension mounting point for a corresponding one of an outboard front wheel and an outboard rear wheel. The at least one wheel suspension mounting point is provided on the surface of one of the first frame member and the second frame member.

According to yet another preferred embodiment of the invention, a frame for an ATV includes a first frame member, a second frame member, and at least a first cross member and a second cross member extending between the first and second members to thereby define a closed perimeter with an engine receiving space therein. A ratio of a sectional width to a sectional height of each of the first member, the second member, the first cross member, and the second cross member is greater than one.

In another preferred embodiment of the invention, a frame for an ATV includes a support module with a central opening defining an engine receiving space. The support module includes a first frame member and a second frame member connected to the first frame member. At least a portion of the support module comprises one of the first and second frame members that includes only a single closed tubular frame member in lieu of a pair of frame members that would normally be provided for the portion of the support module.

In still another preferred embodiment of the invention, a frame for an ATV comprises a first frame member, a second frame member, and at least one cross member extending between the first and second frame members to thereby define an engine receiving space therein. At least one of the first frame member, the second frame member, and the at least one cross member comprises only a single closed tubular structure in lieu of a pair of frame members that would normally be provided.

In another preferred embodiment of the invention, a frame for an ATV comprises a first frame member, a second frame member, and at least one cross member extending between the first and second frame members to thereby define an engine receiving space therein. The first frame member, the second frame member, and the at least one cross member are disposed substantially within a common plane.

Another aspect of the present invention is to provide an ATV with a frame.

Another aspect of the invention is to provide an ATV with improved rigidity over an ATV with a welded space frame.

Yet another aspect of the invention is to provide an ATV with improved rigidity over an ATV with a welded space frame without a corresponding increase in complexity, weight, and/or cost.

According to another exemplary embodiment of the invention, an ATV includes an engine and at least three wheel assemblies. At least one of the at least three wheel assemblies is powered by the engine. The ATV also includes a steering system operatively coupled to at least one of the at least three wheel assemblies. The ATV further includes a suspension system operatively coupled to each of the wheel assemblies and a frame. The frame includes an upper frame member, a lower frame member, and at least a forward cross member and a rearward cross member extending between the upper and lower frame members to thereby define a closed perimeter with an engine receiving space therein. The frame also includes first and second suspension mounting points associated with at least one of the upper frame member, the lower frame member, the forward cross member, and the rearward cross member. At least one of the upper frame member and the lower frame member is positioned substantially along a longitudinal centerline of the frame and extends from the first to the second suspension mounting points.

According to another exemplary embodiment of the invention, an ATV comprises an engine and at least three wheel assemblies. At least one of the at least three wheel assemblies is powered by the engine. The ATV also includes a steering system operatively coupled to at least one of the at least three wheel assemblies. The ATV further includes a suspension system operatively coupled to each of the wheel assemblies and a frame. The frame includes a support module with a central opening for receiving the engine. The support module includes upper and lower longitudinal frame members interconnected by forward and rearward cross members. Each of the upper and lower frame members consists essentially of a single beam.

According to yet another exemplary embodiment of the invention, an ATV includes a frame including at least an upper member and a lower member interconnected with the upper member to define an engine receiving space therebetween. At least one of the upper member and the lower member consists essentially of a single beam having a surface with a plurality of suspension mounting points. At least one of a front outboard wheel assembly and a rear outboard wheel assembly are suspended from the wheel suspension mounting points provided on the surface of one of the upper member and the lower member of the frame. The ATV further includes an engine provided in the engine receiving space for powering at least one of the wheel assemblies.

According to another exemplary embodiment of the invention, an ATV includes an engine and a plurality of wheel assemblies. At least one of the wheel assemblies is powered by the engine. The ATV also includes a suspension system operatively coupled to each of the wheel assemblies and a frame. The frame includes a support module with a central opening for receiving the engine. The support module includes an upper member and a lower member connected to the upper member. At least a portion of the support module comprises one of the upper and lower members that includes only a single closed tubular frame member in lieu of a pair of frame members that would normally be provided for the portion of the supporting module.

In yet another preferred embodiment, an ATV comprises an engine and a plurality of wheel assemblies. At least one of the wheel assemblies is powered by the engine. The ATV includes a suspension system operatively coupled to each of the wheel assemblies and a frame. The frame includes a first frame member, a second frame member, and at least one cross member extending between the first and second frame members to thereby define an engine receiving space therein for receiving the engine. The first frame member, the second frame member, and the forward and rearward cross members are disposed substantially within a common plane.

These and other aspects, features, and advantages of this invention will be described in or become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings:

FIG. 19 is a rear perspective view of yet another preferred embodiment of the present invention.

DETAILED DESCRIPTION OF EXEMPLARY EMBODIMENTS

Figure 1A:
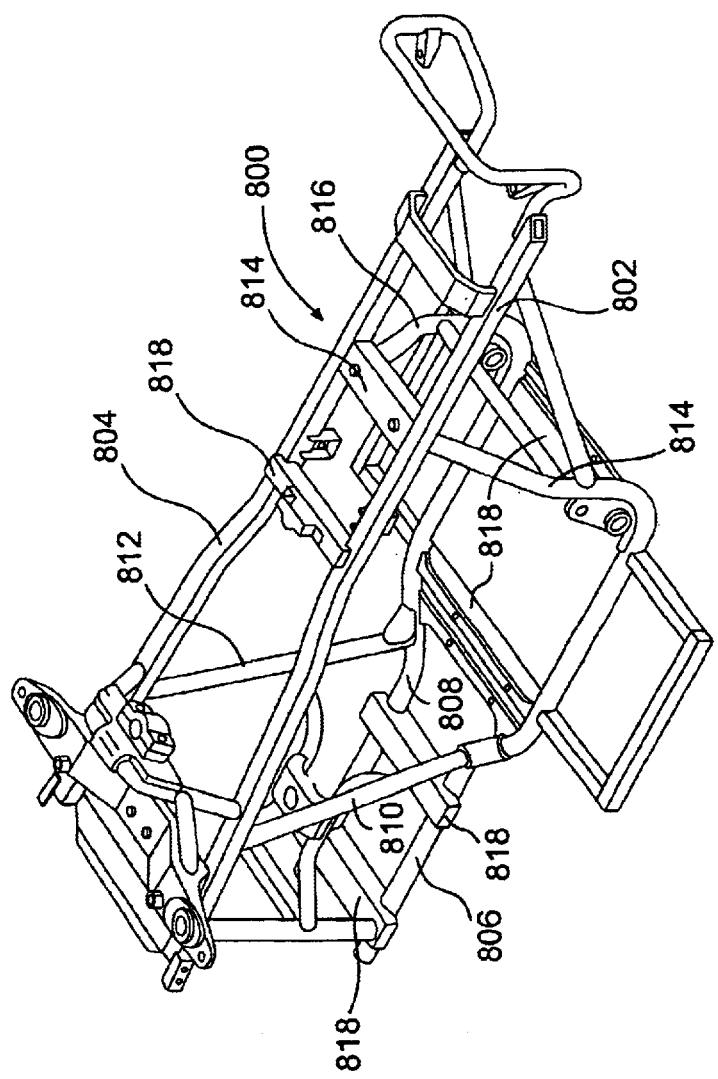
FIGS. 1A–1C are perspective views of conventional space frames typically used in an ATV.
Figure 1B:
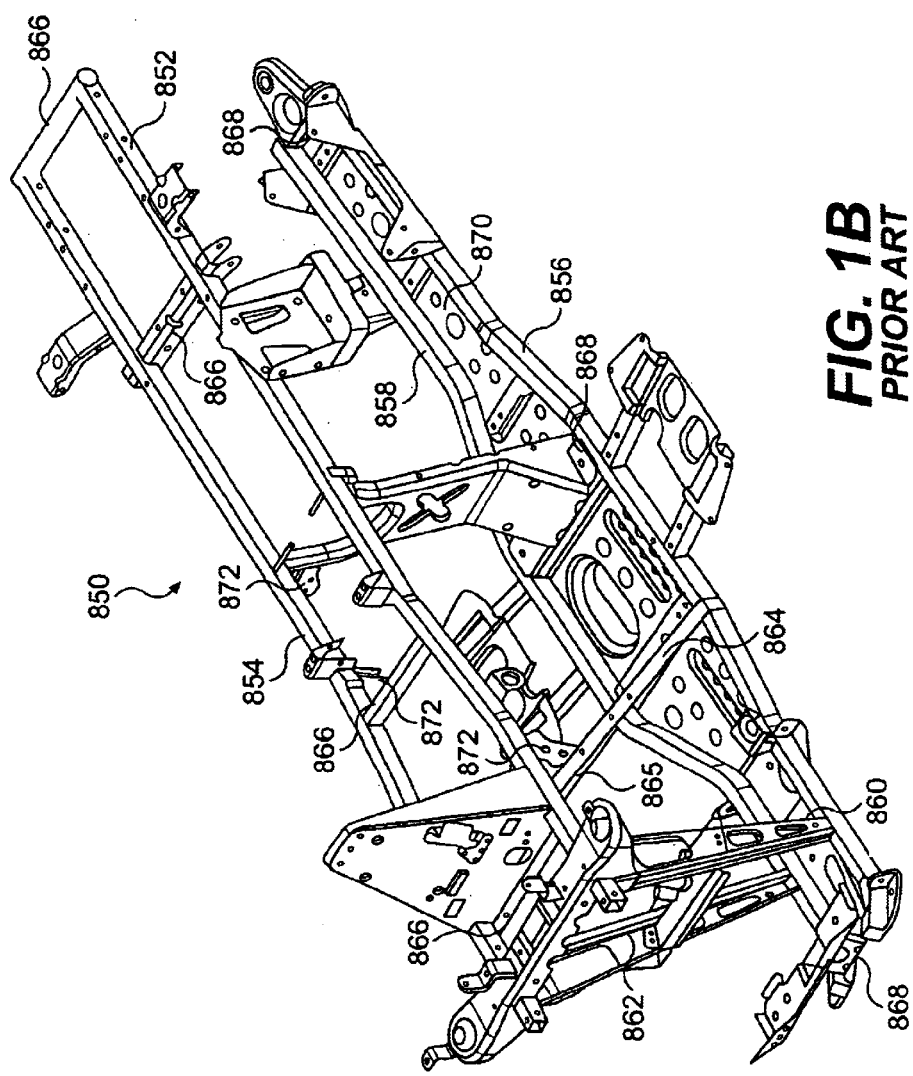
Figure 1C:
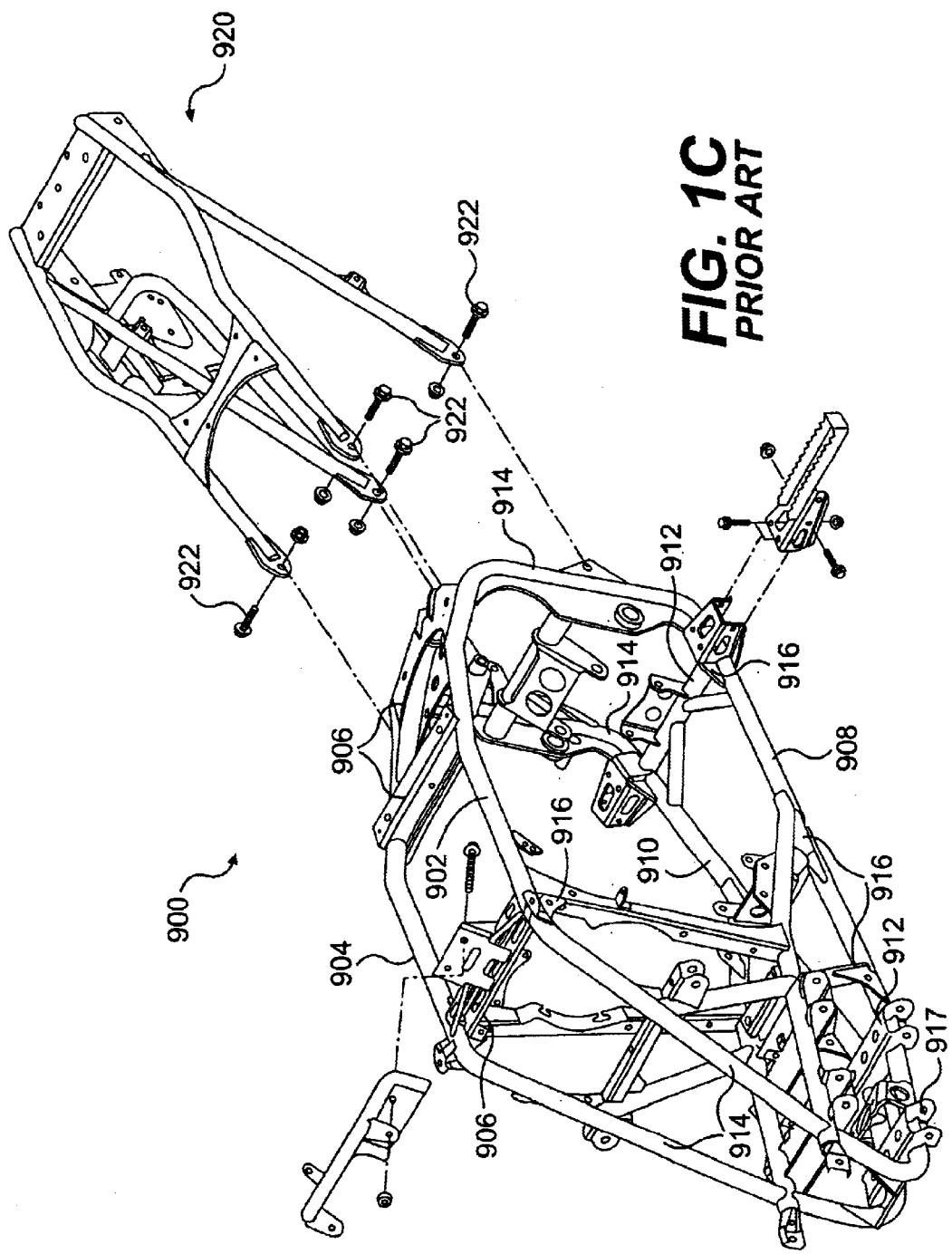
Figure 2:
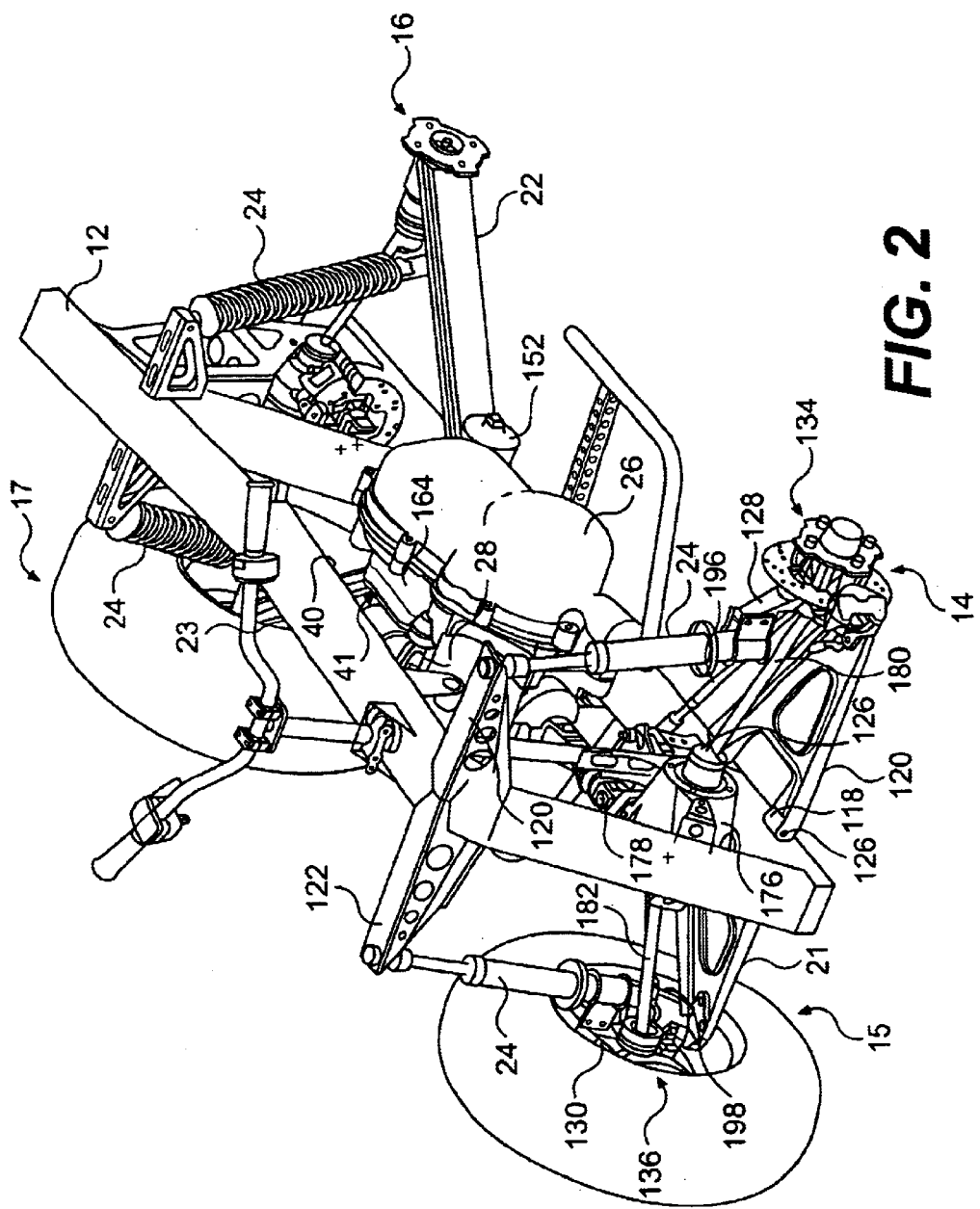
FIG. 2 is a perspective view of one exemplary embodiment of the frame of the present invention showing various ATV components in respective relative positions.
Figure 10:
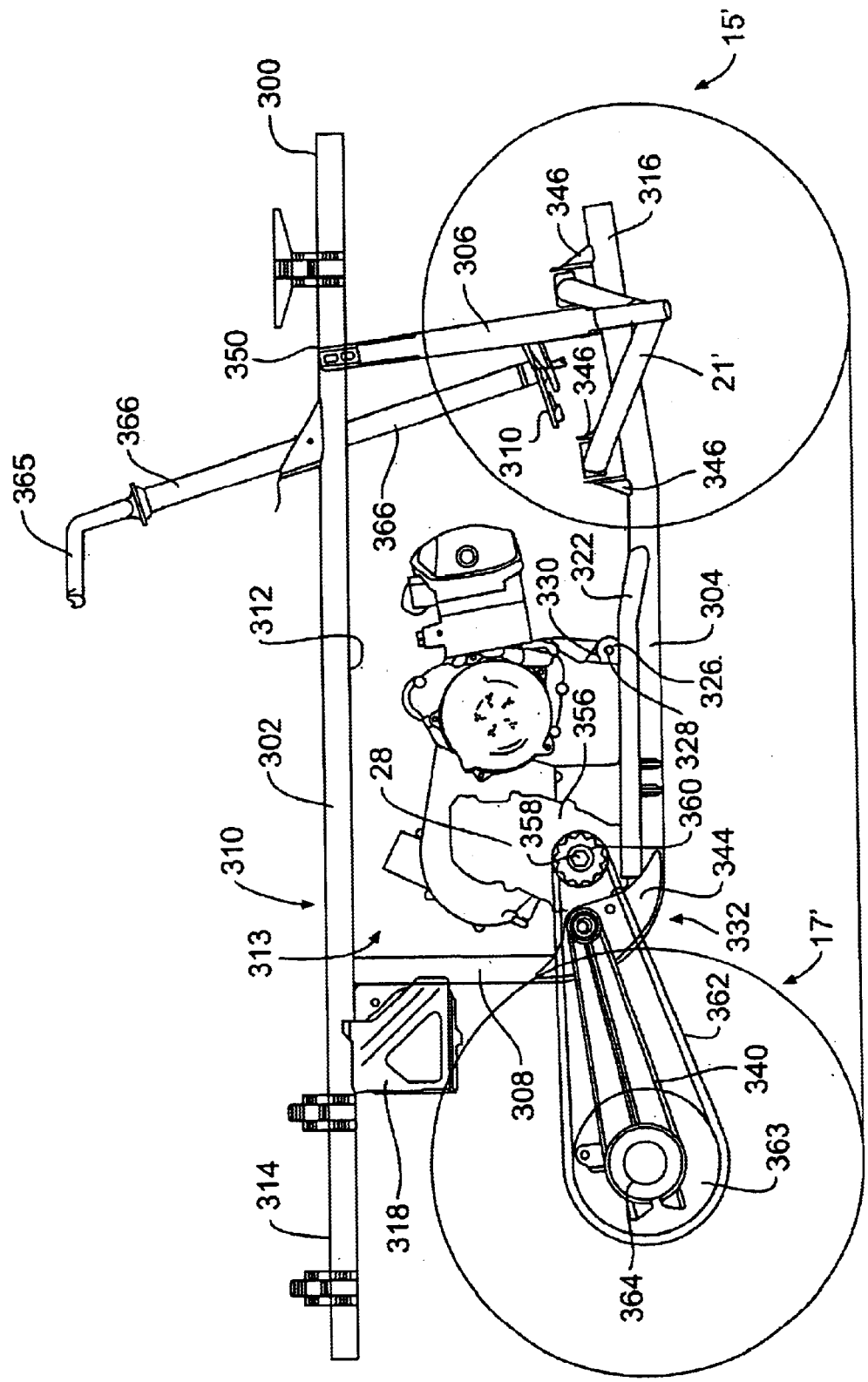
FIG. 10 is a side view of another exemplary embodiment of the frame of the present invention showing various ATV components in respective relative positions thereto.

The present invention is shown and described herein with reference to three exemplary embodiments, shown in FIGS. 2, 10 and 19, respectively. In order to fully describe the embodiments and possible configurations of the present invention, the exemplary embodiments are described with specific respective configurations and with reference to various ATV components. Applicants note that the specific configuration of the present invention may be modified from the exemplary embodiments described herein, as would be obvious to one with ordinary skill in the art, to accommodate other ATV configurations and other ATV components.

FIG. 2 is a view of an exemplary embodiment of a frame 12 of the present invention for an all-terrain vehicle (ATV). In the configuration shown in FIG. 2, the frame 12 is positioned along a longitudinal centerline of the ATV. However, the frame 12 can be positioned in different configurations to accommodate ATVs having different configurations.

The ATV includes a pair of forward wheel assemblies 14, 15 and a pair of rearward wheel assemblies 16, 17. A suspension system of the ATV includes suspension members 20–23 that respectively pivotally connect the wheel assemblies 14–17 to the frame 12. As such, the wheel assemblies 14–17 are movable relative to the frame 12. Biasing members 24, e.g., shock absorbers and/or coil springs, connect between the frame 12 and respective suspension members 20–23 to dampen and/or resiliently bias movement of the suspension members 20–23 relative to the frame 12.

The ATV includes an internal combustion engine 26 that is securely mounted to the frame 12. The engine 26 is operatively coupled to at least one of the wheel assemblies 14–17 via a drive system 28 in order to provide propulsion to the ATV.

Figure 3:
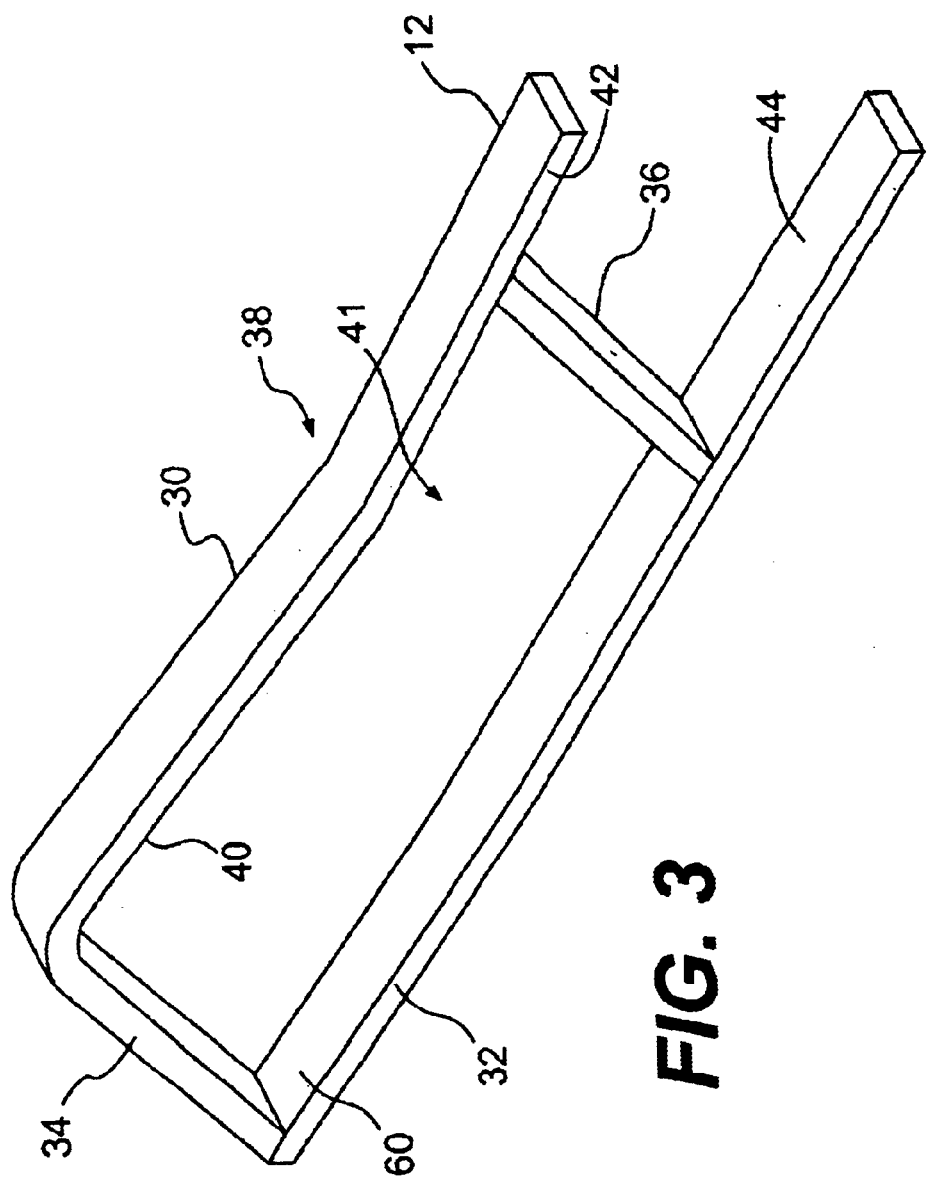
FIGS. 3 and 4 are perspective views of the frame shown in FIG. 2.

As shown in FIG. 3, the frame 12 includes an upper member 30 and a lower member 32. It is noted that either of the upper and lower members 30, 32, or a portion thereof, may be considered as a primary backbone member, or a modular central beam of the frame 12. The upper and lower members 30, 32 are connected by forward and rearward cross members 34, 36. Further, it is noted that the upper and lower members 30, 32 and the forward and rearward cross members 34, 36 may be may be considered to be single beams. In the illustrated embodiment of frame 12, a forward portion of the upper member 30 is bent generally downwardly to form the forward cross member 34. Alternatively, it is contemplated that the members 30, 32, 34, and 36 may be securely interconnected by welding respective members together at connection positions. It is contemplated that the members 30, 32, 34, and 36 may be formed with other configurations. For example, it is contemplated that the rearward portion of the upper member 30 may be bent generally downwardly to form the rearward cross member 36, while a forward portion of the lower member 32 may be bent generally upwardly to form the forward cross member 34. It is also contemplated that either of the upper and lower members 30, 32 may bent into a generally U-shaped configuration and then joined to the other of the upper and lower members 30, 32 to form both of the forward and rearward cross members 34, 36. It is further contemplated that either of the forward and rearward cross members 34, 36 may be bent into a generally U-shaped configuration and joined to the other of the forward and rearward cross members 34, 36 to thereby form both of the upper and lower cross members 30, 32. As mentioned, above other configurations are, of course, possible.

The upper and lower members 30, 32 and the forward and rearward cross members 34, 36 are configured to form a rigid truss structure, or a support module 38. As shown, the support module 38 is defined on upper and lower sides thereof by the upper member 30 and the lower member 32, respectively. Further, the support module 38 is defined on forward and rearward sides thereof by the forward and rearward cross members 34, 36, respectively. A central opening 40 of the support module 38 is provided by inner peripheries (relative to the support module 38) of the members 30, 32, 34, 36 and defines an engine receiving space 41. The support module 38 can support not only the engine 26, but other components of the ATV as well. It is contemplated that, depending on the ATV configuration, the support module 38 may include additional members, other than 30, 32, 34, and 36 in order to support other ATV components.

Figure 4:
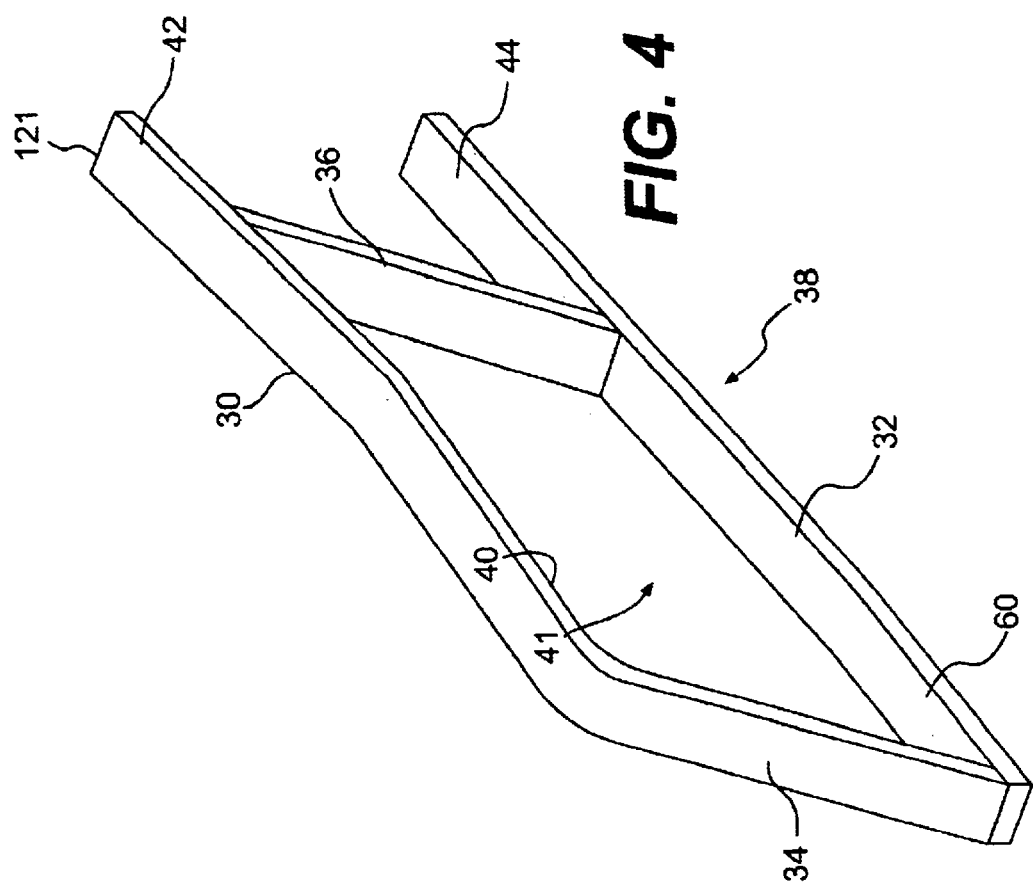

As shown in FIGS. 3 and 4, the support module 38 (likewise, the central opening 40) is generally rectangular shaped with the long dimension coinciding with a longitudinal direction of the frame 12. Further, the cross members 34, 36 are oriented so that upper ends thereof cant slightly rearwardly relative to lower ends thereof and are generally parallel to each other. The rearward cross member 36 is disposed forward of rearwardmost ends of the upper and lower members 30, 32 defining rearward end portions 42, 44 of the members 30, 32, respectively.

The members 30, 32, 34, and 36 of the frame 12 may be considered closed tubular structures and may be preferably constructed of tubular members with elongated sectional geometries; i.e., tubular members with a ratio of a sectional width to a sectional height greater than one. FIGS. 18A–18G show possible contemplated cross sectional configurations (such as taken at line 18A–G—18A–G in FIG. 5) of the members 30, 32, 34, and 36. FIGS. 18A–18G will be further discussed below. It is noted that the members 30, 32, 34, and 36 need not be closed tubular structures. Other possible configurations include I-beam configurations and two beams welded together.

Figure 5:
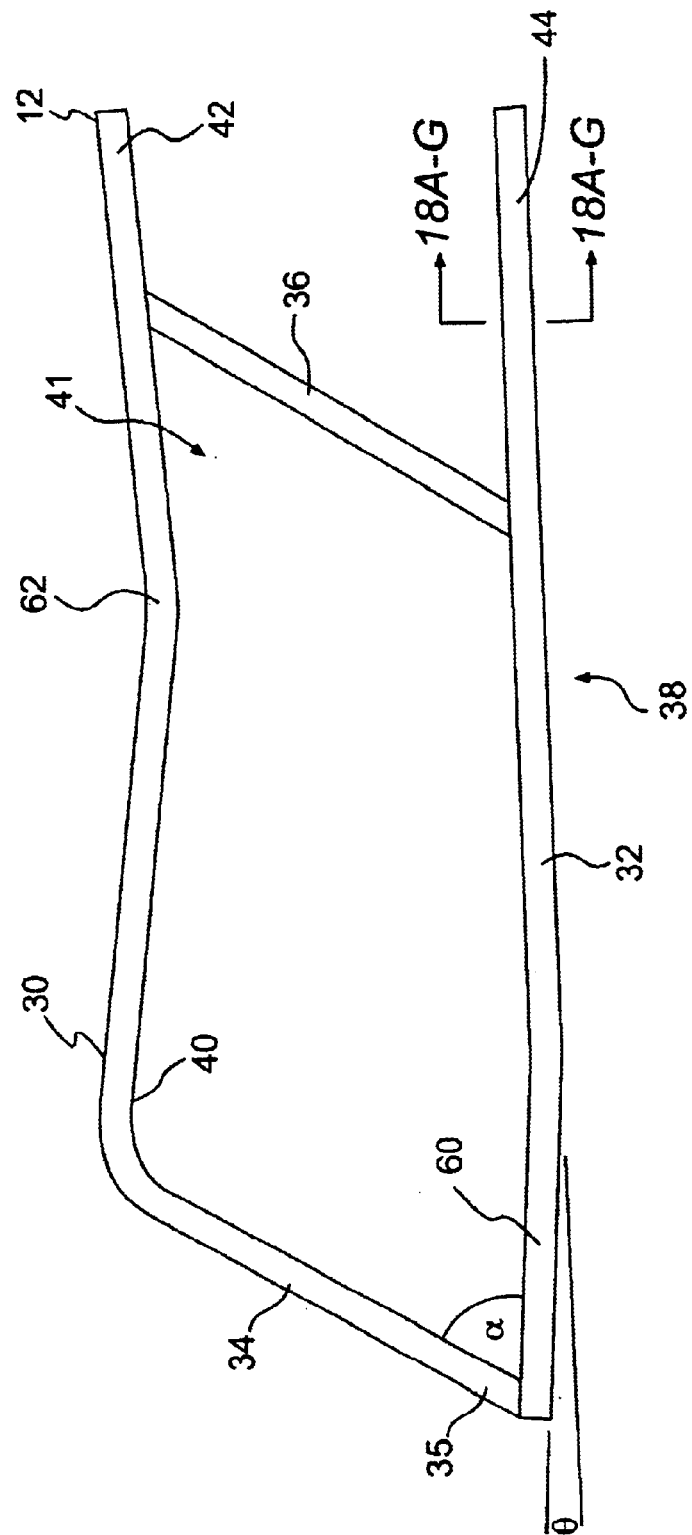
FIG. 5 is a side view of the frame shown in FIGS. 3 and 4.

FIG. 5 shows a side view of the frame 12. As is shown, a forward portion 60 of the lower member 32 is bent slightly upwardly from horizontal to form an angle θ. The forward portion 60 meets or is continuous with a lower portion 35 of the forward cross member 34, and an angle (alpha) is formed therebetween in this embodiment. As discussed herein below, the angled configuration of the forward portion 60 serves to provide the forward suspension components 20, 21 with an angle of attack equal to θ. For this purpose, it is contemplated that θ may be between 0° and 17°, and is preferably about 8°.

Figure 5A:
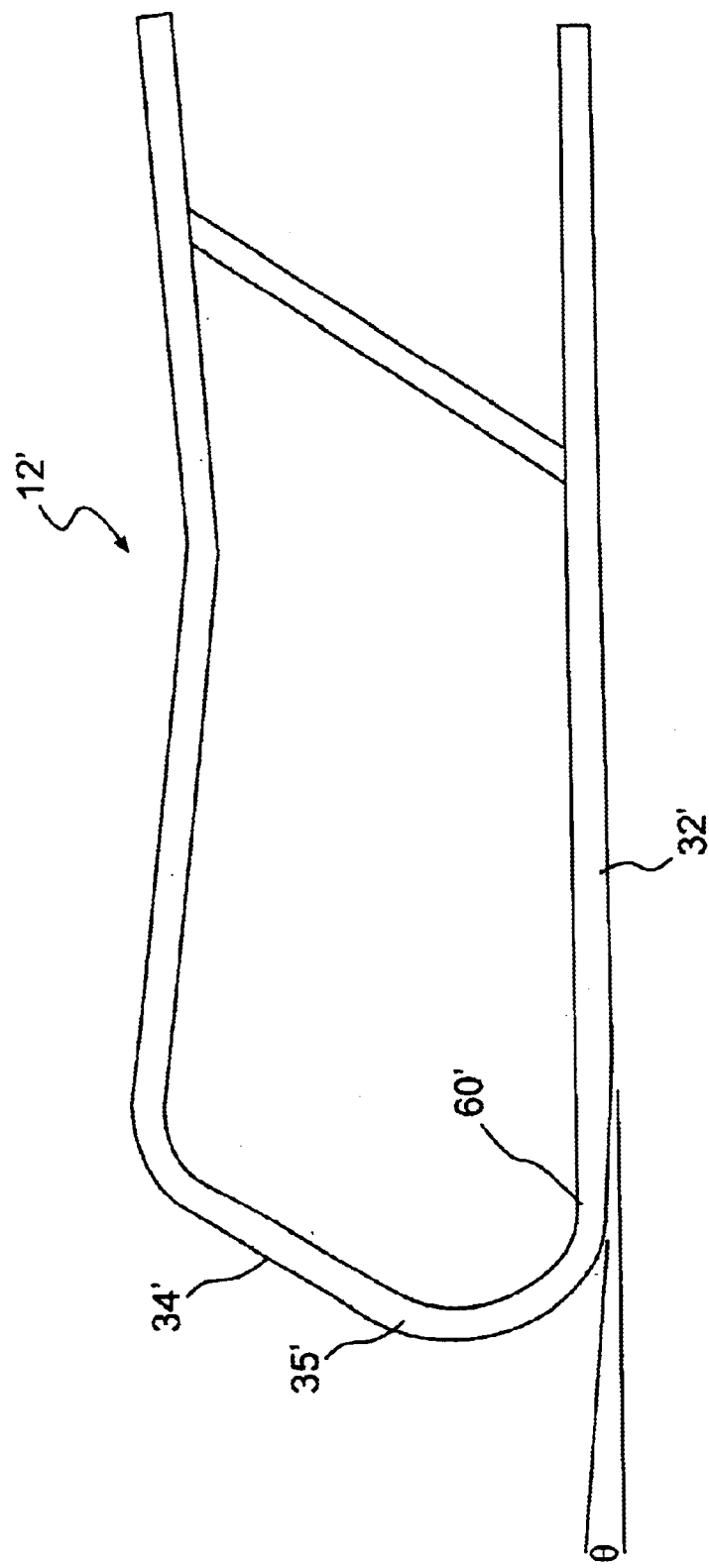
FIG. 5A is an alternative preferred embodiment of the frame shown in FIG. 5.

The frame 12 could be designed differently to achieve a suitable angle of attack. For example, as shown in FIG. 5A, a frame 12' may include a forward portion 60' of a lower member 32' that is bent inwardly toward a lower portion 35' of a forward cross member 34'. The forward portion 60' and the lower portion 35' may form a curved section, which, for example, may have a continuous radius of curvature. An advantage of this alternative is that any obstacles encountered by the ATV can be more easily overcome. Moreover, the upper and lower members 32', 34' and the forward cross member 34' can be formed as a single or integral piece.

Also shown in FIG. 5, the upper member 30 is preferably shaped to provide a generally downwardly extending trough portion 62 within a central region thereof. The trough portion 62 provides a depressed central region of the upper member 30, which allows a seat structure (not shown), for example, a straddle type seat, to be disposed thereon at a lower height, relative to said lower member 32. In other words, the trough portion 62 is closer to the lower member 32 than regions of the upper member 30 immediately forward and rearward of the trough portion 62. As such, a rider situated on the seat structure may more easily access rider controls of the ATV.

Figure 6C:
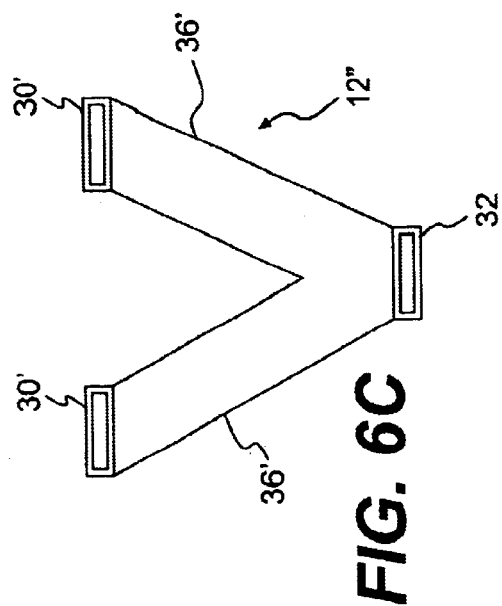
FIGS. 6A–6D are rear end views of alternative preferred embodiments of the frame shown in FIG. 6.
Figure 6D:
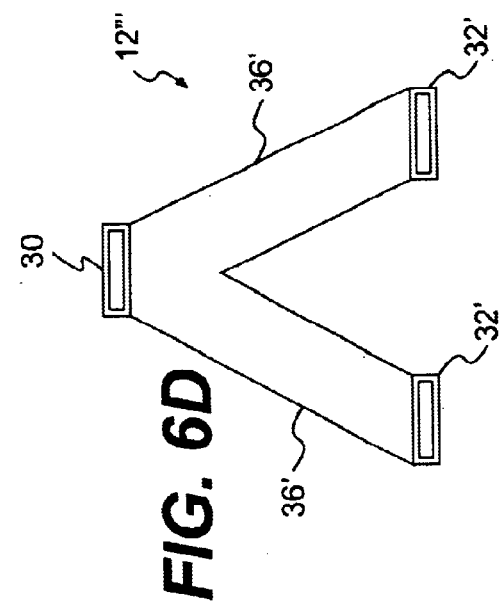
Figure 6A:
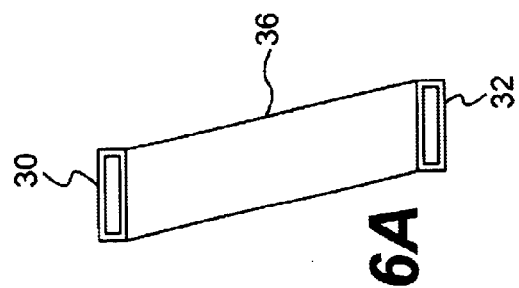
Figure 6B:
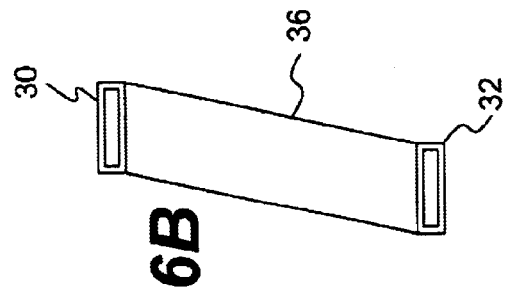
Figure 6:
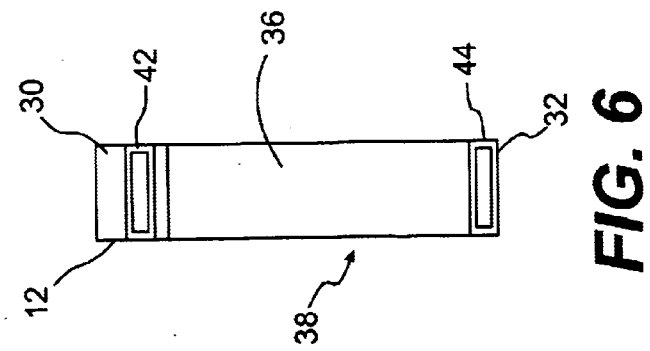
FIG. 6 is a rear end view of the frame shown in FIG. 5.

As shown in FIG. 6, the upper and lower members 30, 32 may be vertically aligned in a vertical plane. In other words, the upper member 30 may be disposed directly above the lower member 32. However, it is also contemplated that the members 30, 32 may be vertically unaligned; e.g., one of the members 30, 32 may be laterally displaced relative to the other member 30, 32. For example, see FIGS. 6A and 6B in which the members 30, 32 are not disposed in a common vertical plane.

FIGS. 6C and 6D show alternative embodiments of the frame 12 shown in FIG. 6. In FIG. 6C, the frame 12" includes two upper half members 30' and a lower member 32. The upper half members 30' replace the single upper member 30 in FIG. 6. The upper half members 30' are connected to the lower member 32 using cross half members 36'. FIG. 6D shows the reverse situation in which the frame 12''' includes two lower half members 32' that are connected to an upper half member 30. In FIGS. 6C and 6D, at least one portion of the frame 12", 12''' includes a single member (e.g., lower member 32 in FIG. 6C or upper member 30 in FIG. 6D) in lieu of a pair of members that would normally be provided for that function. The half members 30' (FIG. 6C) and 32' (FIG. 6D) may be connected by linking structure (not shown).

Figure 7:
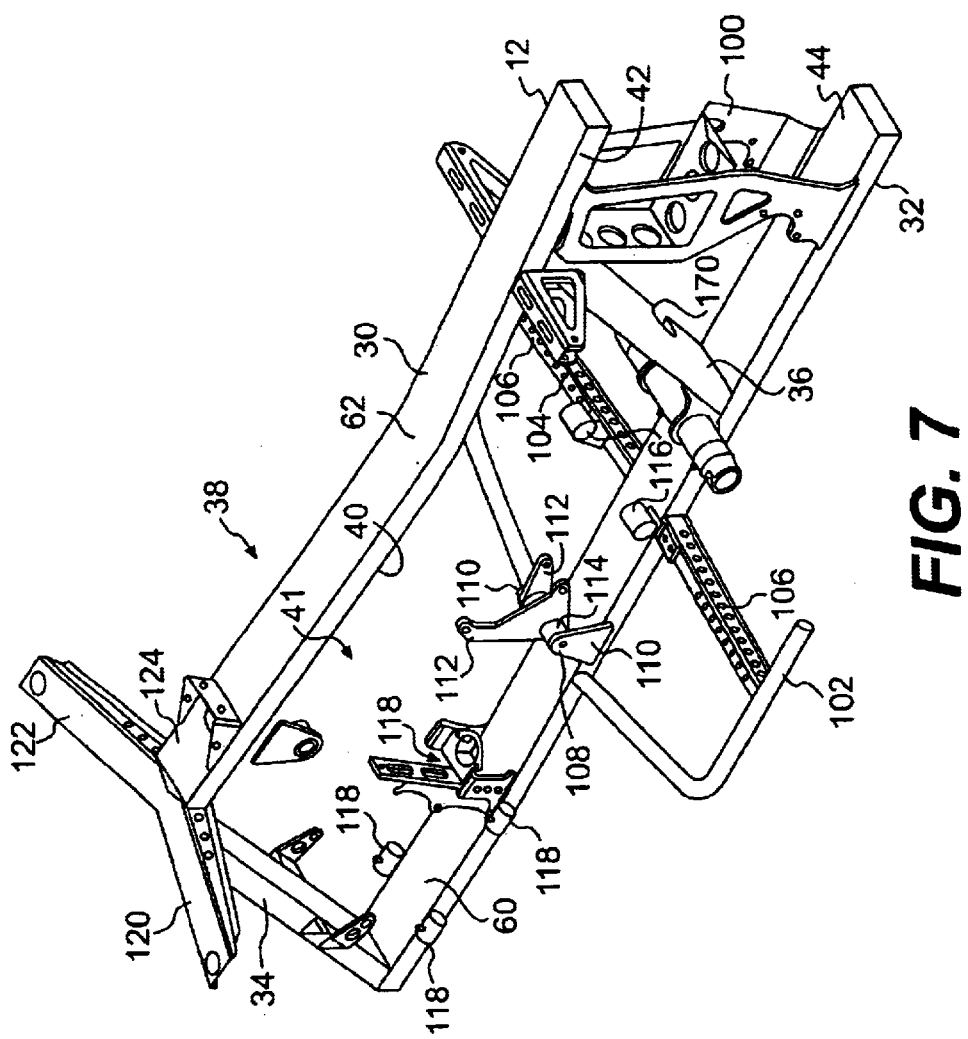
FIGS. 7–9 are different perspective views of the frame shown in FIG. 2 with various ATV components positioned relative thereto.
Figure 8:
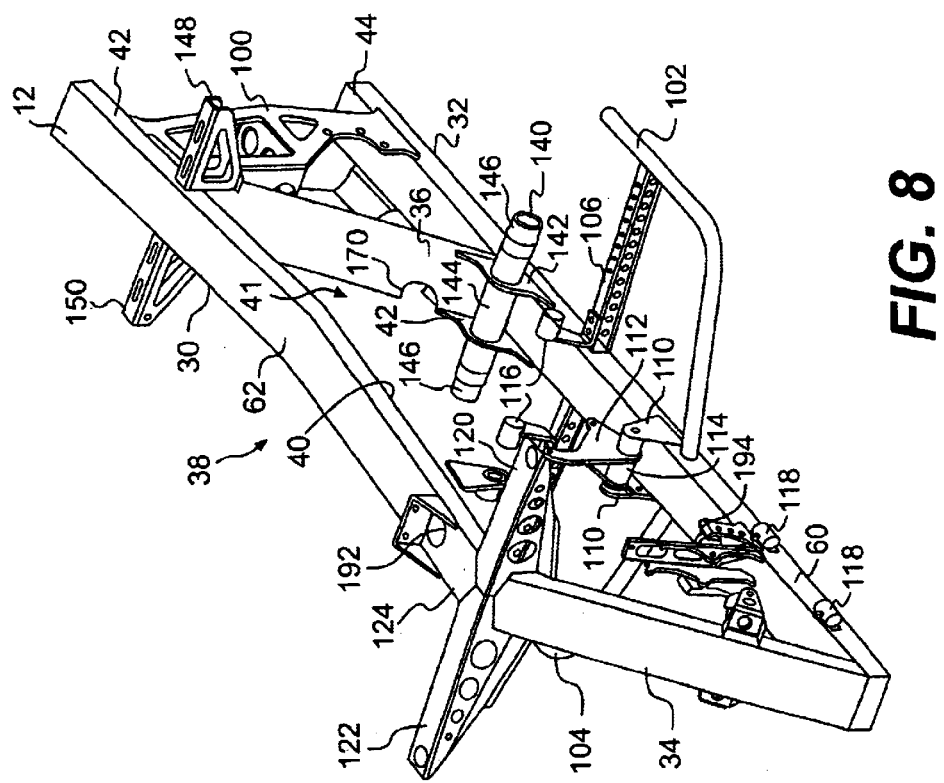
Figure 9:
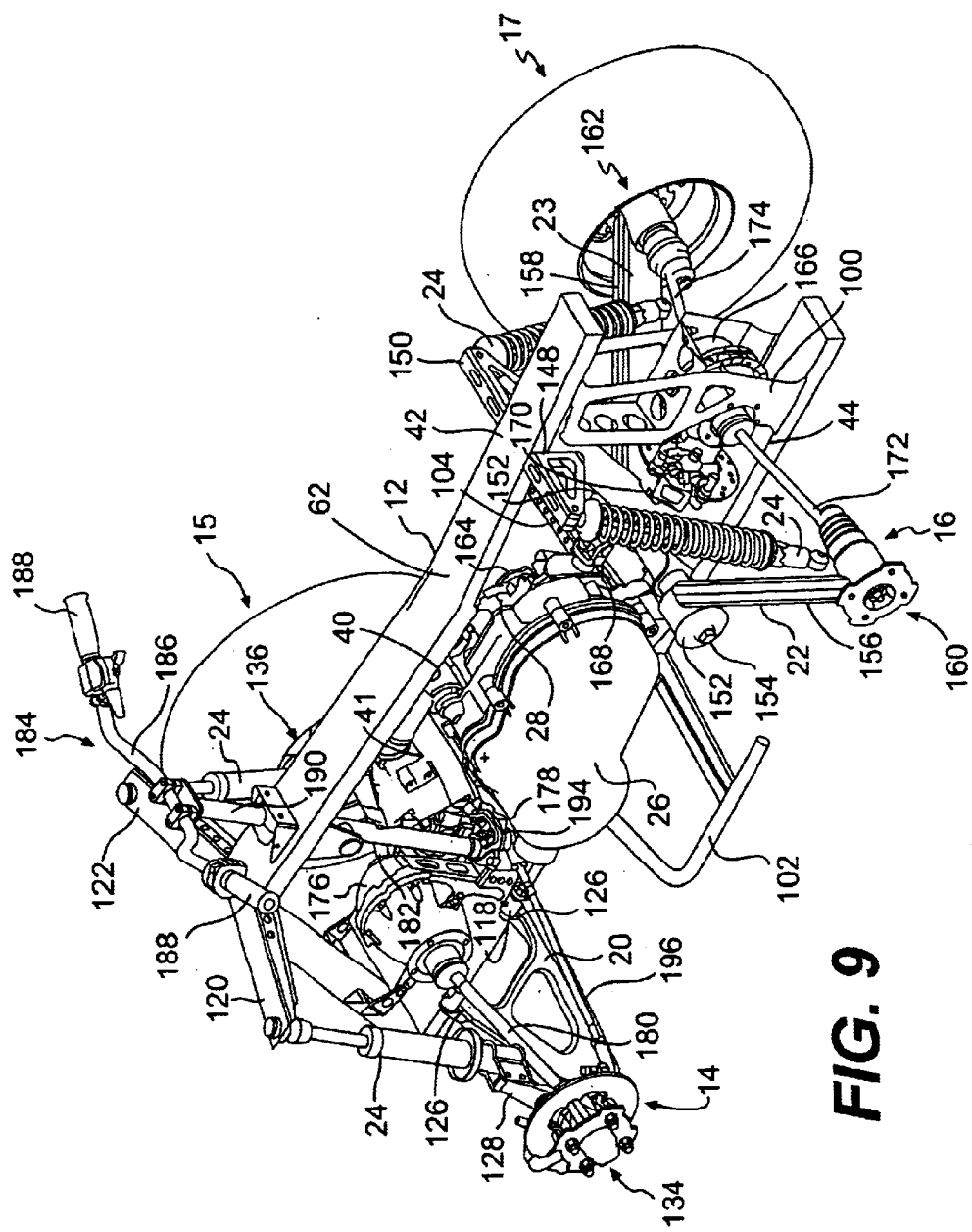

FIGS. 7–9 show the frame 12 with various components of the ATV in their relative positions. It is noted that the specific components, construction of the components, positions of the components (relative to other components and frame 12) shown in these FIGS. (2 and 7–9) are merely exemplary and are shown and described for clarification of the present invention only. It is, of course, possible that different components may be substituted for those shown and described herein and those components shown and/or described may vary in construction and/or placement relative to the frame 12. As discussed above, in light of the description of the present invention herein, it would be obvious to one with ordinary skill in the art to modify the frame 12 to allow other ATV configurations and components to be utilized.

FIG. 7 shows a support structure 100 extending between the upper and lower members 30, 32 rearward of the rearward cross member 36. An upper portion of the support structure 100 is connected (such as by welding) to the rearward portion 42 of the upper member 30 adjacent an upper portion of the rearward cross member 36. A lower portion of the support structure 100 is connected (such as by welding) to the rearward portion 44 of the lower member 32.

A pair of laterally outwardly extending support structures 102, 104 for the rider's feet are mounted to the lower member 32 between the forward and rearward cross members 34, 36. The rider support structures 102, 104 each provide upwardly facing rider support surfaces 106 thereon.

A forward engine support structure 108 may be mounted generally mid-length along the lower member 32. The forward engine support structure 108 has a pair of connecting elements 110 that are securely mounted to respective lateral sides of the lower member 32, such as by welding, and extend upwardly within the central opening 40. A pair of engine mounting brackets 112 may be mounted to a journaling structure 114 extending between and pivotally connected to the connecting elements 110. It is noted that the engine 26 may be mounted to the engine mounting brackets 112 with threaded fasteners (not shown). It is contemplated that the journaling structure 114 may include an elastomeric bushing element (not shown) to dissipate vibrations from the engine 26 (see FIG. 2) so as to limit, or reduce, vibration transfer to the frame 12 from the engine 26. Additionally, the connection between the mounting brackets 112 and the engine 26 may include additional elastomeric bushing elements (not shown) for similar purposes.

A pair of engine mounting elements 116 are mounted to respective rider support structures 102, 104 and extend upwardly therefrom. It is contemplated that the engine 26 may be pivotally mounted to each of the mounting elements 116. Further, as with the journaling structure 114, it may be preferable for the connection between the engine 26 and the mounting elements 116 to include additional elastomeric bushing elements to further reduce vibration transfer between the engine 26 and the frame 12. It is contemplated that mounting elements 116 may be connected to any of the members 30–36 so that the engine 26 may be connectable with any of the members 30–36.

The suspension system of the ATV includes front and rear suspension subsystems. It is noted that the front suspension subsystems described herein below with reference to frame 12 is of the fully independent type, while the rear suspension subsystem is, for example, such as that disclosed in U.S. Patent Application No. 60/226,678, hereby incorporated by reference thereto. It is contemplated, however that other types of suspension subsystems may be adaptable for use the frame 12, such as dual a-arm suspensions or other independent, non-independent, or semi-independent subsystems.

As shown in FIG. 7, the front suspension subsystem includes a plurality of connecting structures 118 securely mounted at a first suspension mounting point (such as by welding) to the forward portion 60 of the lower member 32. Respective pairs of the connecting structures 118 are mounted on each laterally outwardly facing side of the lower member 32. A pair of forward biasing member connecting members 120, 122 are securely mounted to respective sides of the upper member 30 on a forward portion 124 thereof and extend generally laterally outwardly from the upper member 30.

As shown in FIGS. 2 and 9, front suspension subsystem also includes the suspension members, or a-arms 20, 21 provide respective pairs of connecting portions 126 that are pivotably connected to respective connecting structures 118. As such, the a-arms 20, 21 are pivotally movable with respect to the lower member 32 (and, therefore the frame 12). Since the forward portion 60 of the lower member 32 is angled upwardly from horizontal, the connecting structures 118 define pivot axes of the a-arms 20, 21, which are angled upwardly from horizontal coincidentally with the forward portion 60. As such, the a-arms 20, 21 are capable of pivotal movement (from horizontal, as shown in FIG. 9) in a vertical and slightly rearward direction relative to the frame 12. In this manner, the a-arms 20, 21 are provided with an angle of attack, angle $\theta$, as shown in FIG. 5.

Each front wheel assembly 14, 15 is pivotally connected (for pivotal movement about a respective generally vertically extending steering axis) to a laterally outermost end of the respective a-arm 20, 21. Each of the wheel assemblies 14, 15 includes an upright structure 128, 130 that is pivotally connected (for pivotal movement about the respective steering axis) to the outermost end of the respective a-arm 20, 21. Further, a hub assembly 134, 136 is rotatably mounted to a respective upright structure 128, 130.

Upper end portions of biasing members 24 are connected to outermost ends of respective forward biasing member connecting members 120, 122. The biasing members 24 extend generally downwardly toward respective wheel assemblies 14, 15 and are connected to respective upright structures 128, 130.

The biasing members 24 may be in the form of MacPherson struts or another shock absorber/compression spring configuration.

The connecting members 120, 122 are arranged in a cantilevered configuration relative to the upper member 32, while the biasing members 24 are connected at the outermost ends thereof. As such, the connecting members 120, 122 may be subject to large magnitude loadings (such as large magnitude bending and torsional forces) transmitted thereto from the biasing members 24 (in response to rough terrain or cornering). Therefore the connecting members 120, 122 are provided with a cross sectional geometry that provides added rigidity and strength to the members 120, 122. As shown, the cross sectional geometry of the connecting members 120, 122 is preferably U-shaped; however other geometries are, of course, possible. The cross sectional geometry of the connecting members 120, 122 tapers ("thins out") toward the outermost ends thereof, since the bending moment magnitude toward the outermost ends is relatively less than at a position adjacent the upper member 30. In other words, due to the cantilever configuration of the connecting members 120, 122, larger bending moments are experienced by portions of the connecting members 120, 122 closer to the upper member 30.

Referring back to FIG. 8, the rear suspension subsystem includes a rear suspension pivot structure 140 mounted at a second suspension mounting point to the support module 38 adjacent the lower member 32 and the rearward cross member 36. More specifically, the pivot structure 140 includes a pair of mounting members 142, which are securely mounted (such as by welding) to respective sides of a lower portion of the rearward cross member 36 adjacent the lower member 32. The mounting members 142 are additionally mounted (such as by welding) to portions of the lower member 32 adjacent the rearward cross member 36. As such, each of the mounting members 142 are mounted to a corner region of the support module 38 formed by the rearward cross member 36 and the lower member 32. In this manner, the rear suspension pivot structure 140 is substantially rigidly connected to the support module 38. The rear suspension pivot structure 140 also includes a cylindrical shaft member 144 securely mounted to each of the mounting members 142 to extend generally transversely to the support module 38. Opposing end portions 146 of the shaft member 144 are reduced in diameter. Further, as shown in FIG. 8, the rear suspension subsystem includes a pair of rear biasing member connecting members 148, 150 securely connected (such as by welding) to respective sides of the upper member 30. The connecting members 148, 150 may additionally be connected to upper portions of the rearward cross member 36 for added strength/rigidity. Similarly as with the forward biasing member connecting members 120, 122, the rear biasing member connecting members 148, 150 are generally U-shaped to impart strength and rigidity thereto.

As shown in FIG. 9, the rear suspension subsystem further includes the pair of suspension members, or trailing arms 22, 23 pivotally connected to the pivot structure 140. One end of each of the trailing arms 22, 23 includes a journaling portion 152, which pivotally mounts over respective reduced end portions 146 of the shaft member 144. A retaining element 154 axially retains the journaling portions 152 relative to the end portions 146 of the shaft member 144 (shown in FIG. 8). It is noted that the journaling portions 152 pivot about the same axis (on respective end portions 146 of the shaft member 144), which extends transversely relative to the frame 12. The trailing arms 22, 23 include extending portions 156, 158, which extend generally outwardly and rearwardly from respective journaling portions 152 relative to the frame 12. The wheel assemblies 16, 17 are disposed at outermost (in other words, rearwardmost) end portions of the extending portions 156, 158. Hub assemblies 160, 162 of the wheel assemblies 16, 17 are securely mounted (such as by welding) to the outermost end portions of the extending portions 156, 158.

Upper end portions of biasing members 24 are pivotally connected to respective rear biasing member connecting members 148, 150. The biasing members 24 extend generally downwardly from the connecting members 148, 150 toward the hub assemblies 160, 162. It is contemplated that lower end portions of the biasing members 24 may be pivotally connected to the respective hub assemblies 160, 162. However, it is also possible for the lower end portions to be movably connected to respective extending portions 156, 158.

As shown in FIGS. 2 and 9, the drive system 28 includes a transmission 164, which is coupled to a rear differential 166 via a rear driveshaft 168. As shown, it may be preferable for the rearward cross member 36 to provide a generally horizontally extending opening 170, through which the driveshaft 168 may pass. As shown in FIG. 8, the opening 170 is formed through the side of the cross member 36 so as to facilitate removal and installation of the driveshaft 168. Of course, the opening 170 could be formed as a hole through or partially through the cross member 36, rather than being on the side of the cross member 36.

Referring back to FIG. 9, the drive system 28 further includes a pair of half shafts 172, 174, which extend and are connected to respective hub assemblies 160, 162. The half shafts 172, 174 are also coupled to the rear differential 166. In this manner, power generated by the engine 26 is transmitted through the transmission 164, to the rear differential 166 (via the rear driveshaft 168), and then directed to the hub assemblies 160, 162 (via the half shafts 172, 174).

As shown in FIG. 9, the rear differential 166 is mounted to the support structure 100. The half shafts 172, 174 are coupled with the differential 166 to allow pivotal movement of the half shafts 172, 174 relative to the differential 166. As such, the half shafts 172, 174 are able to transmit rotational movement from the differential 166 to the respective hub assemblies 160, 162, while positions of the hub assemblies 160, 162 change relative to the differential 166 (for example, due to movement caused by traversing rough terrain).

It is noted that the unsprung weight of the rear suspension subsystem is substantially reduced, since the differential 166 is mounted to the support structure 100 and does not move with the trailing arms 22, 23.

As shown in FIGS. 2 and 9, the drive system 28 may include a front differential 176 operatively coupled to the transmission 164 via a forward driveshaft 178. A pair of forward half shafts 180, 182 extend between and are coupled to the differential 176 and respective hub assemblies 134, 136. As such, power generated by the engine 26 may be transferred to the transmission 164 and then transmitted to the differential 176 (via the driveshaft 178). The half shafts 180, 182 are connected to respective hub assemblies 134, 136 such that rotational movement of the differential 176 may be transmitted therethrough to each of the hub assemblies 134, 136. As with the rear suspension subsystem, the half shafts 180, 182 are pivotally connected to the differential 176 to allow power transfer to the hub assemblies 134, 136 from the differential 176, while allowing the wheel assemblies 14, 15 to pivot (i.e., the a-arms 20, 21) about the lower member 32.

As shown in FIG. 9, the ATV also has a steering system 184. The steering system 184 includes a steering member 186, which has grip portions 188 on opposite ends thereof. A steering column 190 extends generally downwardly from a central portion of the steering member 186. Shown in FIG. 8, the upper member 30 provides a generally vertically extending opening 192 therethrough, which allows the steering column 190 to pass therethrough and extend toward the lower member 32. Also shown in FIG. 8, a steering control structure 194 is mounted to the lower member 32 and engages a lower portion of the steering column 190. The steering control structure 194 has a pair of outwardly extending steering arms 196, 198 pivotally connected thereto. The steering arms 196, 198 extend toward and are pivotally connected to respective upright structures 128, 130 of the hub assemblies 134, 136. The steering control structure 194 is constructed such that rotational movement of the steering column 190 (e.g., rotational movement of the steering member 186) affects opposing displacements of the steering arms 196, 198. Therefore, the wheel assemblies 14, 15 are pivotally movable (about the respective steering axes) corresponding to the direction and the magnitude of displacement of the steering member 186 (i.e., the steering column 190).

Another embodiment of the frame of the present invention is shown in FIG. 10 and indicated at 300. In the configuration shown in FIG. 10, the frame 300 is positioned along a longitudinal centerline of the ATV. However, the frame 300 can be positioned in different configurations to accommodate ATVs having different configurations.

Figure 11:
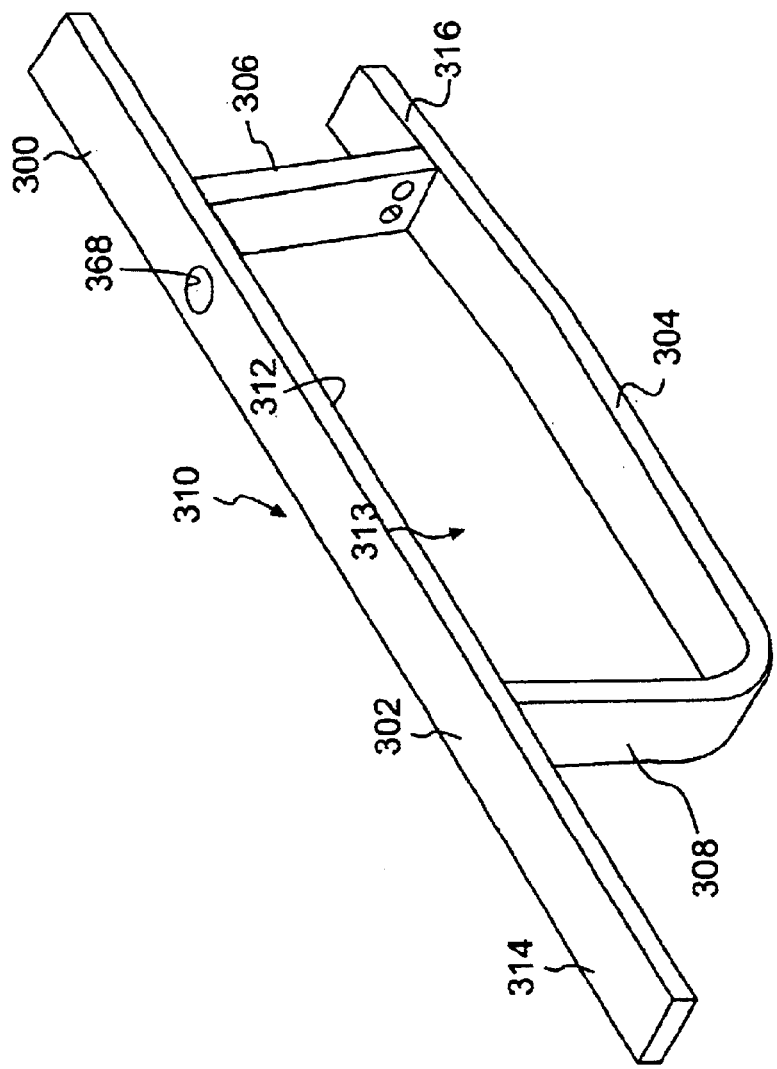
FIGS. 11 and 12 are different perspective views of the frame shown in FIG. 10.
Figure 12:
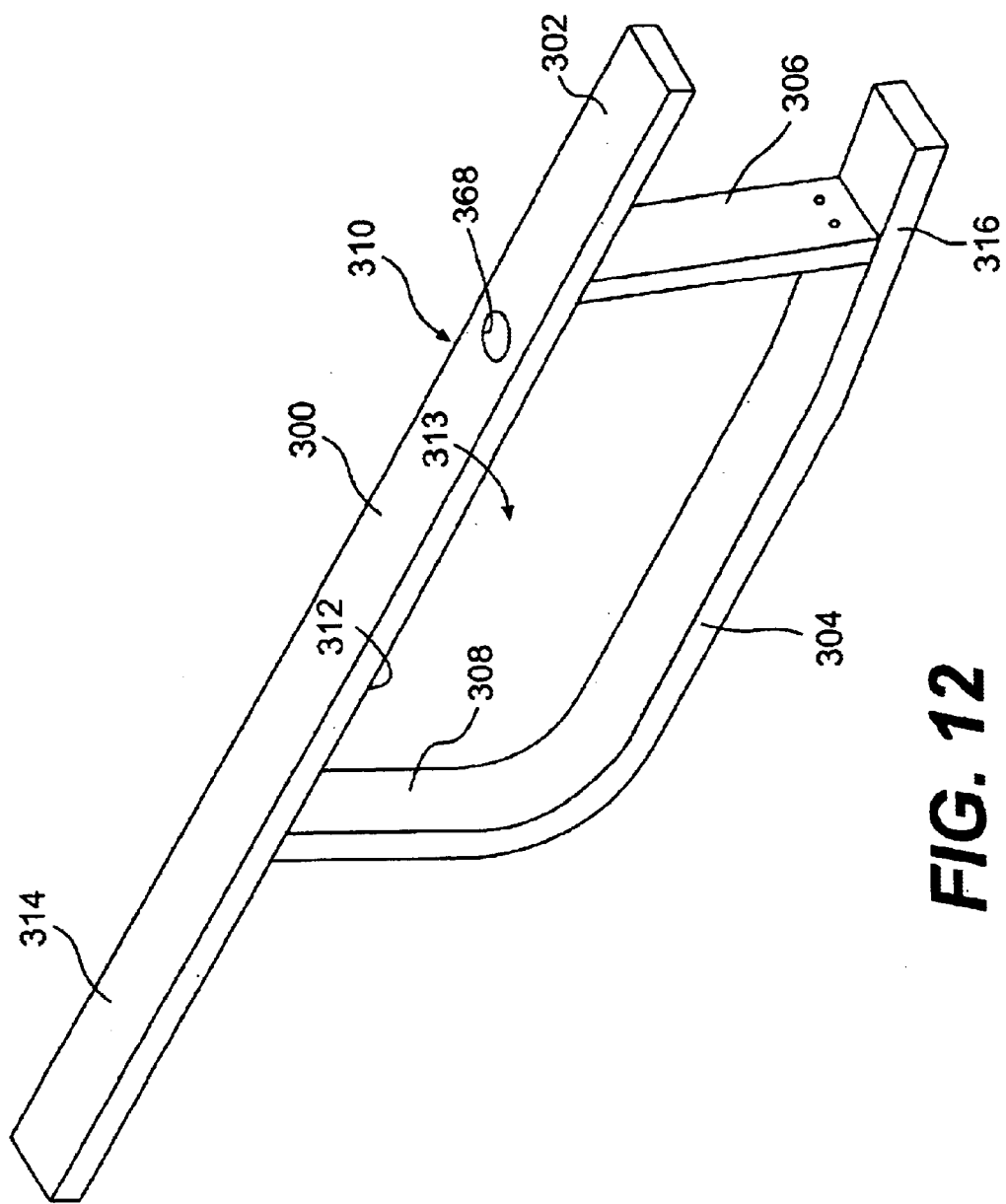
Figure 13:
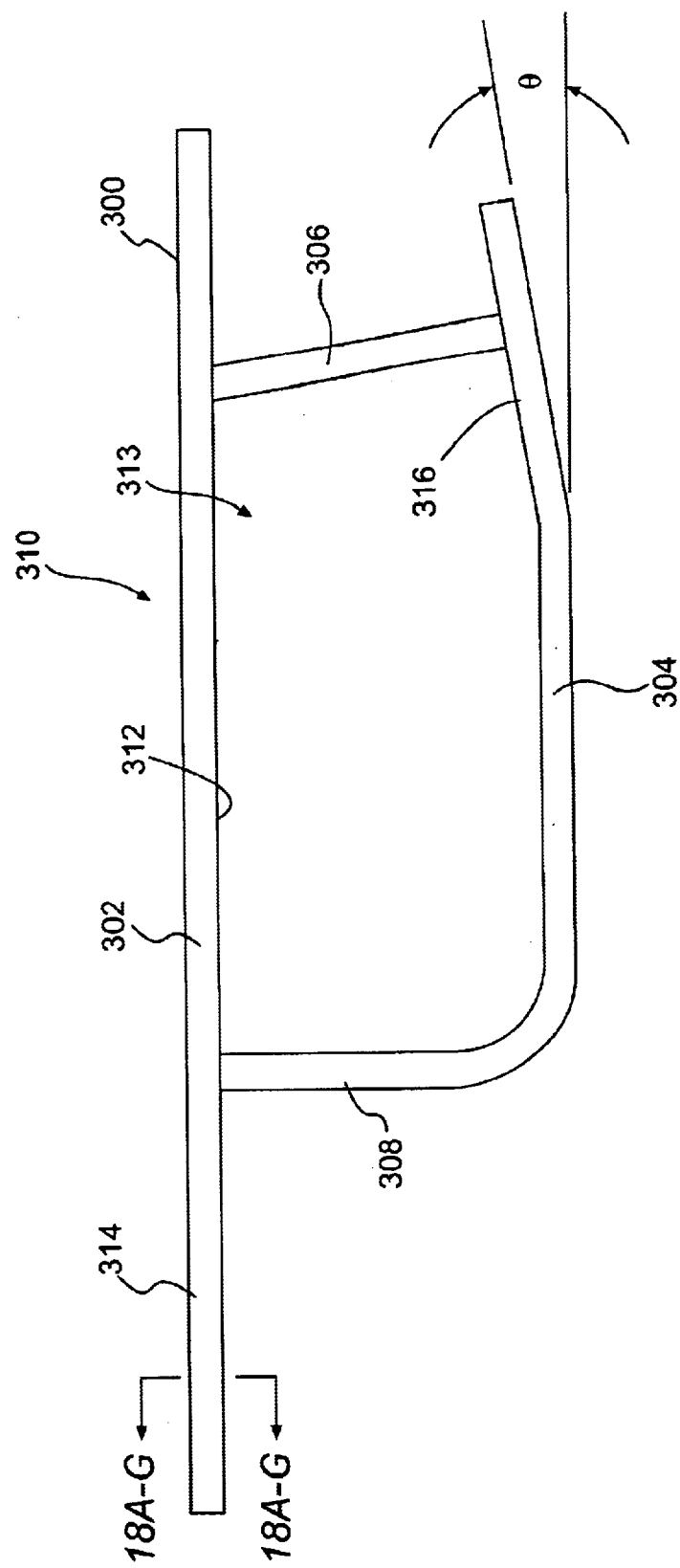
FIG. 13 is a side view of the frame shown in FIG. 10.

As shown, the frame 300 includes an upper member 302 and a lower member 304. It is noted that either of the upper and lower members 302, 304, or a portion thereof may be considered as a primary backbone member or a modular central beam of the frame 300. Further, it is noted that the modular central beam (e.g., either or both of the upper and lower members 302, 304) can be considered to be a single beam. The upper and lower members 302, 304 are connected at respective ends by forward and rearward cross members 306, 308. The upper and lower members 302, 304 and the forward and rearward cross members 306, 308 are configured to form a rigid truss structure, or a support module 310. As shown, the support module 310 is defined on upper and lower sides thereof by the upper member 302 and the lower member 304, respectively. Further, the support module 310 is defined on forward and rearward sides thereof by the forward and rearward cross members 306, 308, respectively. A central opening 312 of the support module 310 is provided between inner peripheries (relative to the support module 310) of the members 302, 304, 306, 308 and defines an engine receiving space 313. As shown in FIGS. 11–13, the support module 310 (likewise, the central opening 312) is generally rectangular shaped with the long dimension thereof coinciding with a longitudinal direction of the frame 300. The forward cross member 306 is oriented such that an upper end thereof cants slightly rearwardly relative to a lower end thereof. Conversely, the rearward cross member 308 is oriented such that it extends generally perpendicularly to the upper and lower members 302, 304. The rearward cross member 308 is disposed forward of a rearwardmost end of the upper member 302, thereby defining a rearward end portion 314 of the upper member 302. As shown, the lower member 304 is bent upwardly (for example, about 90°) at a rearward end portion thereof to thereby form the rearward cross member 308. It is contemplated that the members 302, 304, 306, 308 may be formed with other configurations. For example, it is contemplated that the rearward portion 314 of the upper member 302 may be bent generally downwardly to form the rearward cross member 308, while a forward portion of the lower member 304 may be bent generally upwardly to form the forward cross member 306. It is also contemplated that either of the upper and lower members 302, 304 may bent into a generally U-shaped configuration and then joined to the other of the upper and lower members 302, 304 to form both of the forward and rearward cross members 306, 308. It is further contemplated that either of the forward and rearward cross members 306, 308 may be bent into a generally U-shaped configuration and joined to the other of the forward and rearward cross members 306, 308 to thereby form both of the upper and lower cross members 302, 304. As mentioned, above other configurations are, of course, possible. It is contemplated that, depending on the particular ATV configuration, the support module 310 may include additional members other than 302, 304, 306, and 308, in order to support other ATV components.

The members 302, 304, 306, and 308 of the frame 300 may be considered closed tubular structures and may be preferably constructed of tubular members with elongated sectional geometries; i.e., tubular members with a ratio of a sectional width to a sectional height greater than one. FIGS. 18A–18G show possible contemplated cross sectional configurations (such as taken at line 18A–G—18A–G in FIG. 13) of the members 302, 304, 306, and 308. FIGS. 18A–18G will be described in more detail below. It is noted that the members 302, 304, 306, and 308 need not be closed tubular structures. Other possible configurations include an I-beam configuration and two beams welded together.

FIG. 13 shows a forward portion 316 of the lower member 304 is bent slightly upwardly from horizontal to form an angle θ. The angled configuration of the forward portion 316 serves to provide front suspension components 20', 21' with an angle of attack equal to θ. For this purpose, it is contemplated that θ may be between 0° and 17°, and is preferably about 8°.

FIGS. 10 and 14–17 show the frame 300 with various components of the ATV in their relative positions. It is noted that the specific components, construction of the components, positions of the components (relative to other components and frame 300) shown in these FIGS. (10 and 14–17) are merely exemplary and are shown and described for clarification of the present invention only. It is, of course, also possible that other different components may be substituted for those shown and described herein.

Figure 14:
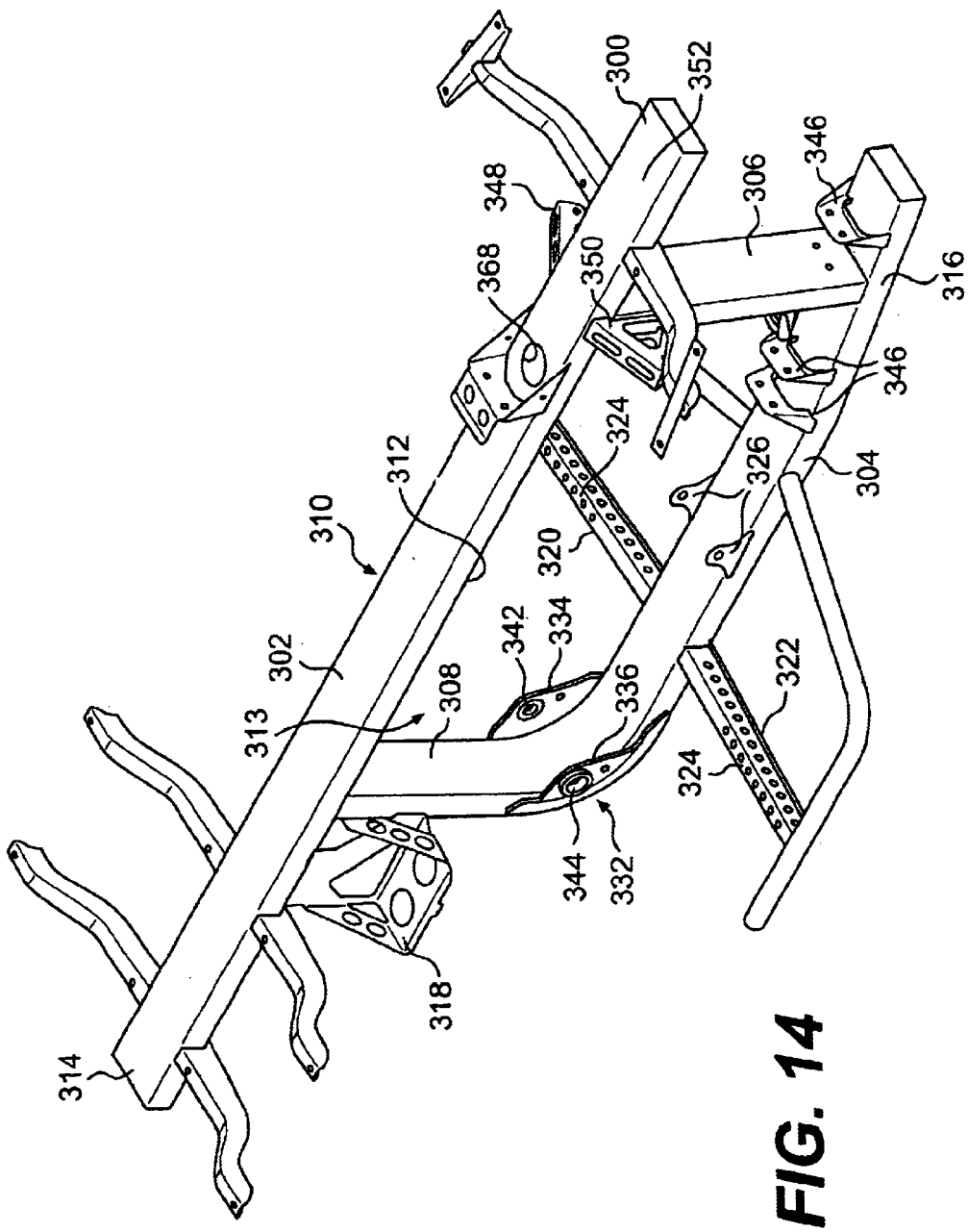
FIGS. 14–17 are different perspective views of the frame shown in FIG. 10 with various ATV components positioned relative thereto.

FIG. 14 shows a support module 318 mounted (such as by welding) to a downwardly facing surface of the rearward end portion 314 adjacent the rearward cross member 308. The support module 318 may also be secured (such as by welding) to an upper portion of the rearward cross member 308.

A pair of laterally outwardly extending support structures 320, 322 for the rider's feet are mounted to the lower member 304 between the forward and rearward cross members 306, 308. The rider support structures 320, 322 each provide upwardly facing rider support surfaces 324 thereon.

A pair of engine mounting elements 326 are mounted to the lower member 304 and extend upwardly therefrom. An engine 26' is mounted to each of the mounting elements 326, via a pin connector 328. The pin connector 328 extends between and through the mounting elements 326 and through a forward connecting portion 330 of the engine 26'. It may be preferable for the connection between the engine 26' and the mounting elements 326 to include an elastomeric bushing element between either of the mounting elements 326 or the connecting portion 330 and the pin connector 328 to further minimize vibration transfer between the engine 26' and the frame 300. It is contemplated that mounting elements 326 may be connected to any of the members 302–308 so that the engine 26' may be connectable with any of the members 302–308.

Figure 15:
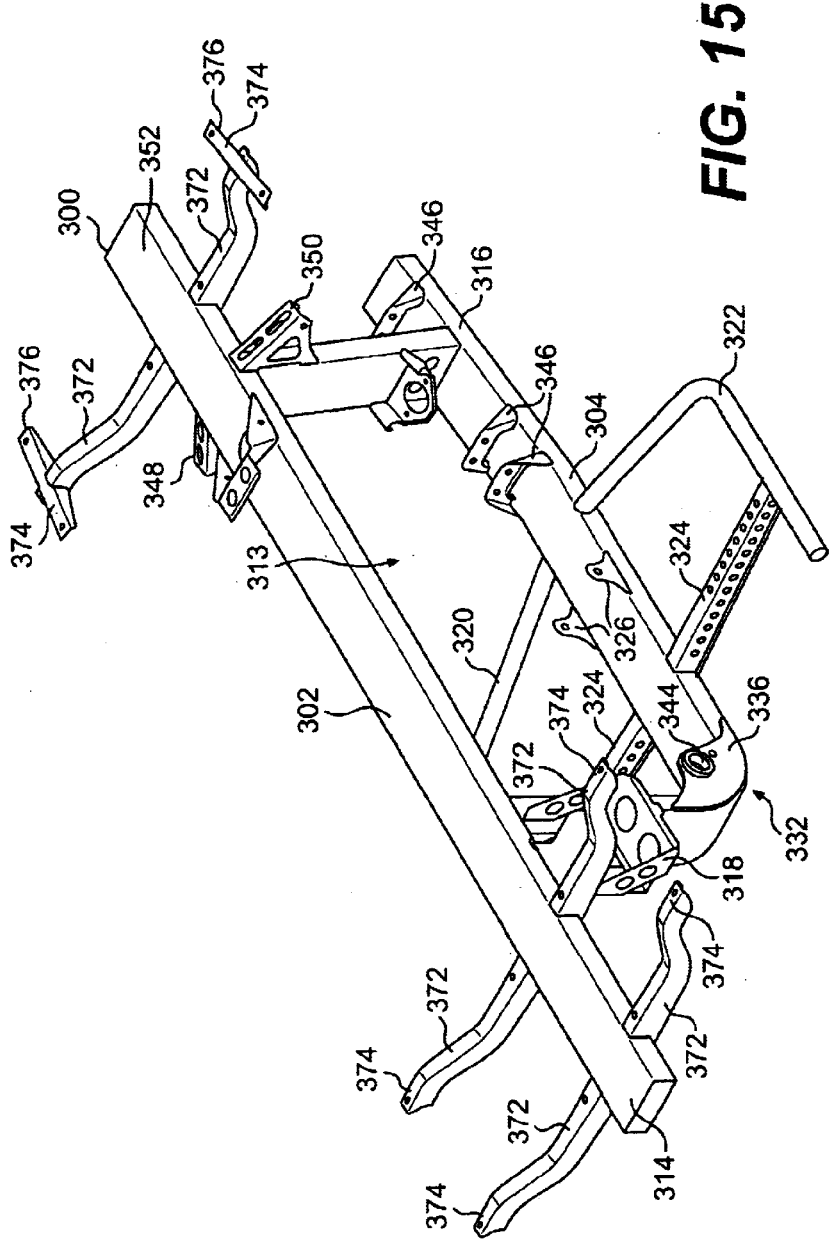
Figure 16:
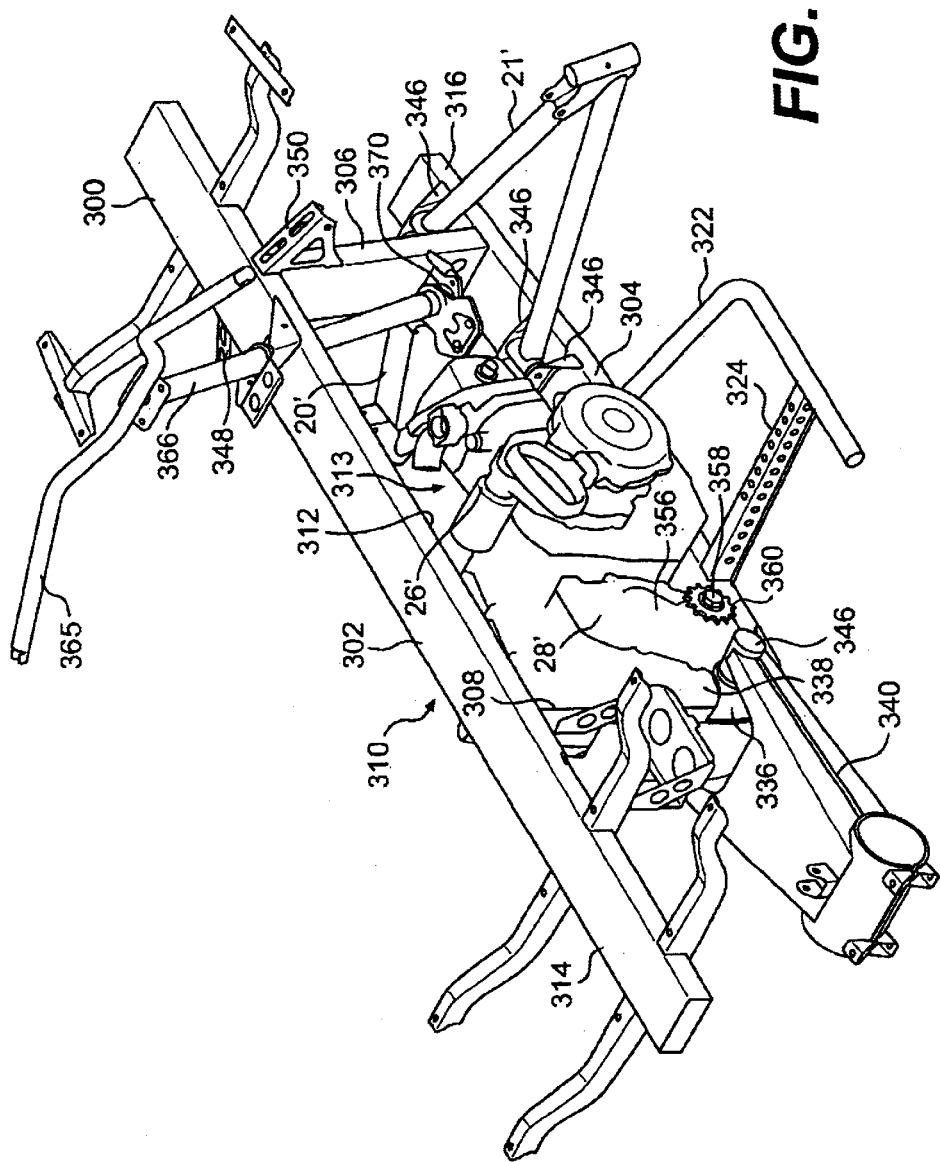

Referring to FIGS. 14 and 15, an additional engine mounting structure is provided in the form of a swing arm connecting structure 332. The swing arm connecting structure 332 includes a pair of web structures 334, 336 mounted to the support module 310 adjacent the rearward cross member 308 and the lower member 304. The web structures 334, 336 are securely connected (such as by welding) to respective sides of a lower portion of the cross member 308 and a rearward portion of the lower member 304. A rearward connecting portion 338 (see FIG. 16) of the engine 26' is positioned between the web structures 334, 336 and is securely connected thereto. As shown in FIG. 16, one end of a swing arm 340 is pivotally mounted to the web structures 334, 336, as well. It is contemplated that a retaining element (not shown) may pass through the rearward connecting portion 338 of the engine 26' and extend through respective openings 342, 344 (see FIG. 14) within each of the web structures 334, 336. It is also contemplated that opposite end portions of the retaining element may extend laterally (relative to the frame 300) outwardly past the web structures 334, 336 and engage respective journal portions 346 of the swing arm 340. As such, the web structures 334, 336 serve to both partially securely mount the engine 26' to the frame 300 within the central opening 312 and to pivotally mount the swing arm 340 to the frame 300.

As discussed previously, the suspension system of the ATV includes front and rear suspension subsystems. As with the embodiment described above, the front suspension subsystem may be of the independent, semi-independent, or non-independent types. As shown, the rear suspension subsystem is readily adaptable to the swing arm or rigid type suspension subsystem; however it is contemplated that any of the independent, semi-independent, or non-independent type subsystems may also be suitable. As shown in FIG. 14, the front suspension subsystem includes a plurality of connecting structures 346 securely mounted at a first suspension mounting point (such as by welding) to the forward portion 316 of the lower member 304. Each of the connecting structures 346 is mounted on an upwardly facing surface of the lower member 304 and extends generally upwardly therefrom. A pair of forward biasing member connecting members 348, 350 are securely mounted to respective sides of the upper member 302 on a forward portion 352 thereof and extend generally laterally outwardly from the upper member 302. The connecting members 348, 350 may also be securely connected (such as by welding) to respective sides of the forward cross member 306.

Figure 17:
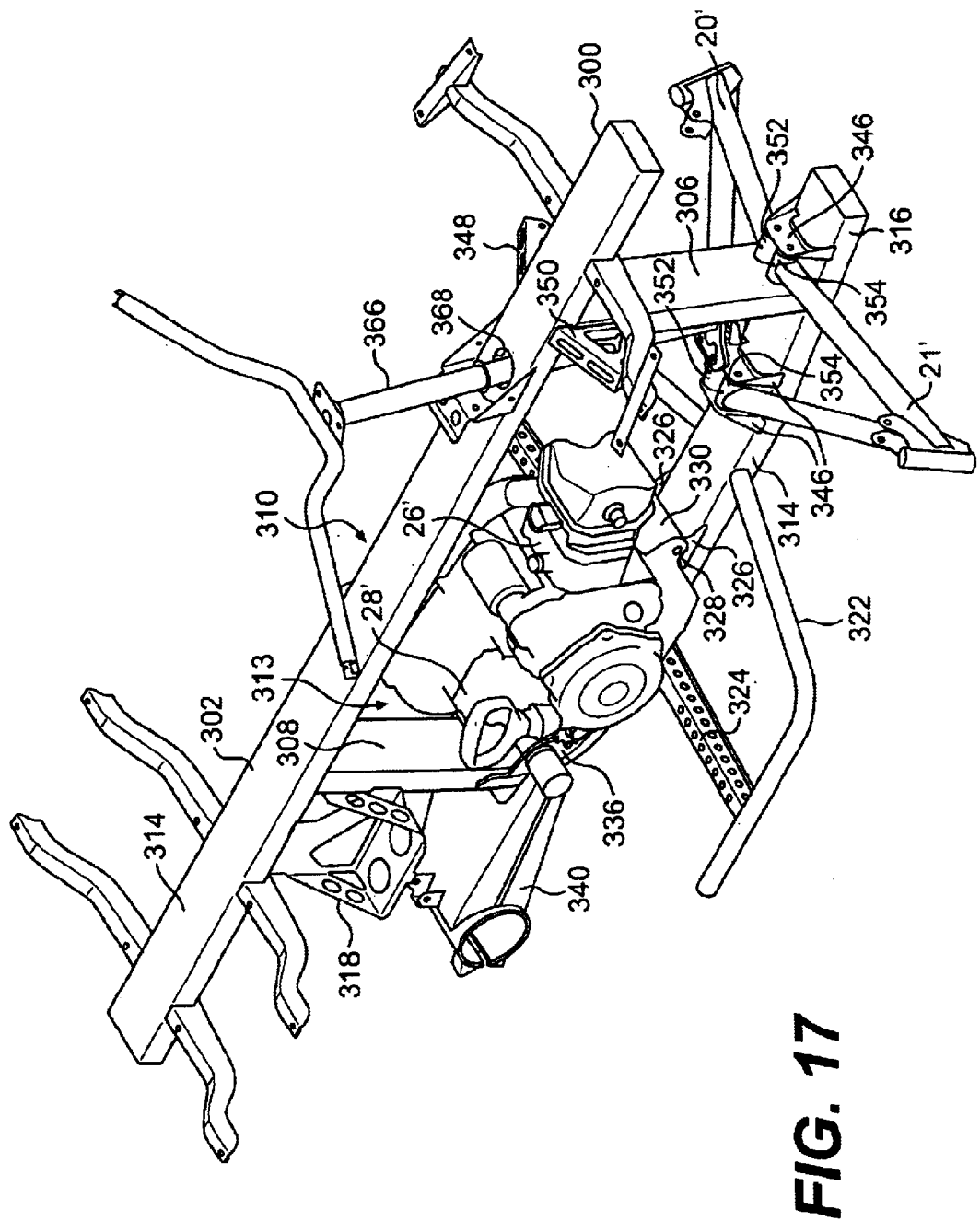

As shown in FIGS. 10 and 17, front suspension subsystem includes suspension members, or a-arms 20', 21' provide respective pairs of connecting portions 352, 354 that are pivotably connected to respective connecting structures 346. As such, the a-arms 20', 21' are pivotally movable with respect to the lower member 304 (and, therefore the frame 300). Since the forward portion 316 of the lower member 304 is angled upwardly from horizontal, the connecting structures 346 define pivot axes of the a-arms 20', 21', which are angled upwardly from horizontal coincidentally with the forward portion 316. As such, the a-arms 20', 21' are capable of pivotal movement in a vertical and slightly rearward direction relative to the frame 300. In this manner, the a-arms 20', 21' are provided with an angle of attack, angle θ, shown in FIG. 13.

A wheel assembly 15' is pivotally connected (for pivotal movement about a respective generally vertically extending steering axis) to a laterally outermost end of the respective a-arm 21', as described above. Similarly, a wheel assembly (not visible) is pivotally connected to a laterally outermost end of the respective a-arm 20' described above. Each of the wheel assemblies e.g., 15', may include an upright structure that is pivotally connected (for pivotal movement about the respective steering axis) to the outermost end of the respective a-arm 20', 21'. Further, a hub assembly, as described above, is rotatably mounted to the respective upright structure.

The rear suspension subsystem includes the swing arm 340 and a biasing member (not shown). The swing arm 340 is pivotally mounted at a second suspension mounting point to the swing arm connecting structure 332 to be capable of pivotal movement relative to the frame 300. A biasing member is connectable between the rearward cross member 308 and/or the rearward portion 314 of the upper member 302; and the swing arm 340 to thereby bias movement of the swing arm 340 relative to the frame 300.

As shown in FIGS. 10 and 16, a drive system 28' of the ATV includes a transmission 356 operatively coupled to the engine 26'. The transmission 356 includes an output member 358, which has a drive member 360 fixedly mounted on an end thereof. A power transmission element 362 engages the drive member 360 and a driven member 363. The driven member 363 is mounted to a shaft member 364, which is operatively coupled to at least one of wheel assemblies 16', 17'. In the embodiment illustrated in FIG. 10, the power transmission element 362 is in the form of a drive chain, while the drive and driven members 360, 363 are in the form of chain sprockets.

As shown in FIGS. 10 and 16, the ATV also has a steering system, which includes a steering member 365. The steering member 365 may have grip portions (not shown) on opposite ends thereof. A steering column 366 extends generally downwardly from a central portion of the steering member 365. Shown in FIG. 17, the upper member 302 provides a generally vertically extending opening 368 there through, which allows the steering column 366 to pass there through and extend toward the lower member 304. Referring back to FIGS. 10 and 16, a steering control structure 370 is mounted to the forward cross member 306 and engages a lower portion of the steering column 366. The steering control structure 370 may have a pair of outwardly extending steering arms (not shown), which are connectable with respective wheel assemblies e.g., 15', to thereby impart pivotal movement of the wheel assemblies (about respective steering axes). The steering control structure 370 is constructed such that rotational movement of the steering column 366 (e.g., rotational movement of the steering member 365) pivotal movement of the wheel assemblies corresponding to the direction and the magnitude of displacement of the steering member 365 (i.e., the steering column 366).

As shown in FIG. 15, a plurality of body mounting members 372 are mounted to and extend laterally outwardly from the upper member 302. The embodiment illustrated in FIG. 15 includes a pair of body mounting members 372 connected to respective sides of the forward end portion 352 of the upper member 302. Also shown in FIG. 15, pairs of body mounting members 372 are mounted to each side of the rearward portion 314. The body mounting members 372 provide upwardly facing body mounting surfaces 374 thereon. The body mounting members 372 may additionally include flange members 376, which provides the body mounting surfaces 374 thereon.

It is contemplated that the basic design of the frames of the present invention, including the exemplary embodiments described herein, may be adaptable for use in a side-by-side passenger off-road vehicle or an in-line passenger ATV. A side-by-side passenger off-road vehicle is a vehicle specifically designed to sit a driver and one or more passengers in a side-by-side arrangement. An in-line passenger ATV includes two or more seats arranged in a one-behind-the-other configuration to allow a driver and at least one passenger to ride thereon. It is also contemplated that a single elongated seat configured to allow the rider and passenger to both ride thereon may be used in lieu of separate seats.

The members 30, 32, 34, 36 of the frame 12 and 302, 304, 306, 308 of the frame 300 are each preferably formed of similar type and size tubular members. However, it is contemplated that tubular members of varying size and sectional configurations may be utilized for the various members 30, 32, 34, 36 and 302, 304,306, and 308. Further, the members 30,32,34,36 and 302, 304,306, and 308 need not be formed of tubular members with uniform cross sectional configurations. For example, portions of the frames 12 and 300 (i.e., portions of the members 30, 32, 34, 36 and 302, 304, 306, and 308) that have relatively smaller loads exerted thereon, may be formed with a relatively thinner wall thickness. Another example is that the members 30, 32, 34, 36 and 302, 304, 306, and 308 may be formed to have varying sectional width-to-height ratios along lengths thereof.

Figure 18A:
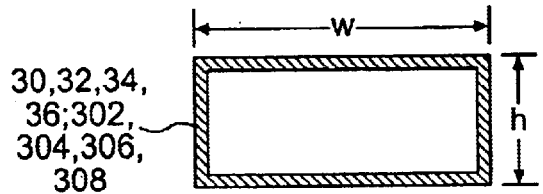
FIGS. 18A–18G are cross sectional views of exemplary configurations for the upper member, lower member, forward cross member, and rearward cross member taken along line 18A–G—18A–G in FIG. 5 or line 18A–G—18A–G in FIG. 13.
Figure 18B:
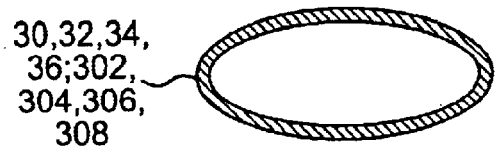
Figure 18C:
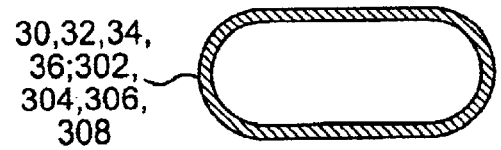
Figure 18D:
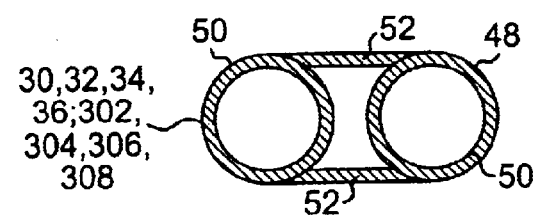
Figure 18E:
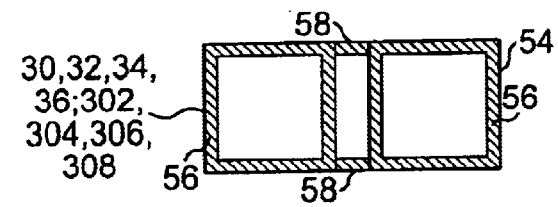
Figure 18F:
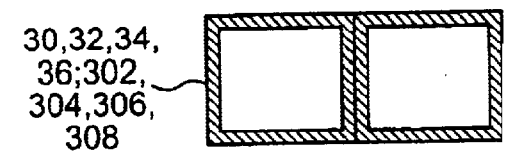
Figure 18G:
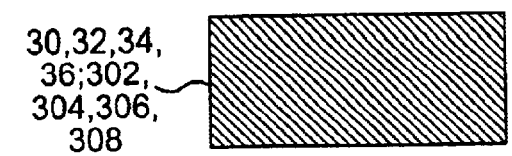

It is noted that the members 30, 32, 34, 36 of the frame 12 and 302, 304, 306, 308 of the frame 300 are preferably formed from tubular members with an elongated sectional geometry (i.e., a first dimension being relatively greater than a second dimension normal to the first dimension). FIGS. 18A–18G show some examples of cross sectional configurations of the members 30, 32, 34, 36 taken at line 18A–G–18A–G in FIG. 5 and of the members 302, 304, 306, and 308 taken at line 18A–G–18A–G in FIG. 13. A rectangular sectional configuration is shown in FIG. 18A. As indicated, a first dimension, for example width (indicated by w in FIG. 18A) is greater than a second dimension, for example height (indicated by h in FIG. 18A) of the sectional geometry. More specifically, a ratio of width w (the first dimension) to height h (the second dimension) of the section is greater than 1. FIG. 18B shows an elliptical sectional configuration, which also has a ratio of width to height greater than 1. FIG. 18G shows an oval sectional configuration. It is noted that for members with an ellipsoidal cross sectional geometry, such as shown in FIGS. 18B, 18C, and 18D, the first dimension, or width w, is provided by the major axis of the section and the second dimension, or height, is provided by the minor axis of the section.

FIG. 18D shows a composite sectional configuration, which has an outer periphery 48 similar to that shown in FIG. 18C including an overall width to height ratio greater than 1. The member 30, 32, 34, and 36 or 302, 304, 306, and 308 with this configuration may include a spaced pair of generally circular tubular members 50 interconnected by a pair of over-lying portions 52. FIG. 18E shows a different composite sectional configuration, which has an outer periphery 54 similar to that shown in FIG. 18A. The member 30, 32, 34, and 36 or 302, 304, 306, and 308 with this configuration may include a spaced pair of square or rectangular tubular members 56 that are interconnected by a pair of over-lying portions 58. FIG. 18F shows a sectional configuration formed with a pair of joined adjacent square, or rectangular, tubular members. FIG. 18G shows a tubular member with a solid sectional configuration of a rectangular geometry. Other shapes and/or sectional configurations, e.g., an I-beam configuration, are, of course, possible.

It is contemplated that members 30, 32, 34, 36 or 302, 304, 306, and 308 with homogenous sectional configurations, such as shown in FIGS. 18A–18C, may be formed by extruding or hydroforming any metallic material, preferably mild steel, any alloy of steel (such as, chromium/molybdenum alloy steel), or any alloy of aluminum. Other contemplated materials include titanium, other metals, or composite materials. It is also contemplated that the members may alternatively be roll formed from a suitable metallic material, which includes welding a seam along the length of the member. Members 30, 32, 34, 36 or 302, 304, 306, and 308 with composite sectional configurations, such as shown in FIGS. 18D–18F, may be formed by extruding, hydroforming, or roll forming the tubular members 50, 56 and then welding the over-lying portions 52, 58 thereto. Members 30, 32, 34, 36 or 302, 304, 306, and 308 with solid sectional configurations, such as shown in FIG. 18G, similarly may be formed of any metallic material. It is also contemplated that members 30, 32, 34, 36 or 302, 304, 306, and 308 may be formed with a polymer material, such as with an injection molding process or die-casting. Composite materials may also be utilized.

In development, rectangular steel tubes of 14 or 16 Ga have been used for the frame members 30, 32, 34, 36 or 302, 304, 306, and 308. Satisfactory results have been obtained from rectangular tubing of a size 3"×2", 4"×1.5", and 5"×1". It has been shown that the frames 12, 300 of the present invention may be manufactured from 5"×1" 14 Ga rectangular tubing (such as shown in FIG. 18A) to withstand approximately 2.7 times the amount of torque applied to the frame before any part of the frame exceeds a predetermined stress above which damage to the frame can occur, as compared to a conventional space frame (of comparable dimensions) constructed of 1" 14 Ga circular tubular members.

As shown, the members 30, 32, 34, and 36 or 302, 304, 306, and 308 are formed of similar type and size tubular members. However, it is contemplated that tubular members of varying size and sectional configurations may be utilized for the various members 30, 32, 34, and 36 or 302, 304, 306, and 308. Further, the members 30, 32, 34, and 36 or 302, 304, 306, and 308 need not be formed of tubular members with uniform cross sectional configurations along lengths thereof. For example, portions of frames 12, 300 (i.e., portions of the members 30, 32, 34, and 36 or 302, 304, 306, and 308) that have relatively smaller loads exerted thereon, may be formed with a relatively thinner wall thickness. Another example is that the members 30, 32, 34, and 36 or 302, 304, 306, and 308 may be formed to have varying sectional width-to-height ratios along lengths thereof.

Another embodiment of the present invention is shown in FIG. 19. FIG. 19 shows a frame 1000 that includes a rearward cross member 1004 and left and right lateral members 1006, 1008 that form a rigid truss structure, or a peripheral support module with an engine receiving space 1010. The left and right members 1006, 1008 may be separately formed and then joined, e.g., by welding, or they may be formed of a single piece which has a bend in it, as shown. Further, the rear, right and left members are disposed within a common plane, which is this case is the horizontal plane. In comparison, the frame 12 in FIG. 2 and the frame 300 in FIG. 10 have members that are disposed in the vertical plane. However, as with the frames 12 and 300, the members of the frame 1000 need not be in the same plane. The members can be arranged depending on the specific needs of the ATV for which the frame 1000 is to be used. Each of the left and right members 1006, 1008 may include an aperture or connection point 1012 to which a suspension, e.g., a rear swing arm suspension, may be attached.

While the principles of the present invention have been made clear in the illustrative embodiments set forth above, it will be apparent to those skilled in the art that various modifications may be made to the structure, arrangement, proportion, elements, materials, and components used in the practice of the invention.

What is claimed is:

1. A frame for an ATV comprising:
   a first frame member;
   a second frame member;
   at least a first cross member and a second cross member extending between said first and second frame members to thereby define a closed perimeter with an engine receiving space therein; and
   first and second outboard wheel suspension mounting points associated with at least one of the first frame member, the second frame member, the first cross member, and the second cross member;

wherein at least one of the first frame member and the second frame member is positioned substantially along a longitudinal centerline of the frame and extends from the first outboard wheel suspension mounting point to the second outboard wheel suspension mounting point;

wherein one of the first and second outboard wheel suspension mounting points is constructed and arranged to position a front pair of wheels at a longitudinal position where the front pair of wheels define an axis of rotation, when being steered straight ahead, that is positioned rearward of a forwardmost portion of the frame;

wherein at least one of the first and second frame members consists essentially of a single beam.

2. A frame according to claim 1, wherein the first and second frame members define forwardmost and rearwardmost portions, and at least one of the first and second outboard wheel suspension mounting points is structured to define a wheel rotation axis positioned between the forwardmost and rearwardmost portions.

3. A frame according to claim 1, wherein said single beam comprises a closed tubular structure.

4. A frame according to claim 1, wherein at least one of the first and second outboard wheel suspension mounting points is on a surface of one of the first and second frame members.

5. A frame according to claim 1, wherein a ratio of a sectional width to a sectional height of at least one of the first member, the second member, the first cross member, and the second cross member is greater than one.

6. A frame according to claim 5, wherein at least one of said first and second members and said first and second cross members has a rectangular cross section.

7. A frame according to claim 5, wherein at least one of said first and second members and said first and second cross members has an oval cross section, said sectional width being a major axis of said oval cross section and said sectional height being a minor axis of said oval cross section.

8. A frame according to claim 5, wherein each of said first and second members and said first and second cross members has an elliptical cross section said sectional width being a major axis of said elliptical cross section and said sectional height being a minor axis of said elliptical cross section.

9. A frame according to claim 1, wherein said first member is vertically aligned with said second frame member.

10. A frame according to claim 1, wherein each of said first and second members and said first and second cross members has a uniform cross section throughout a length thereof.

11. A frame according to claim 1, wherein each of said first and second members and said first and second cross members has an identical cross sectional shape.

12. A frame according to claim 1, wherein each of said first and second members and said first and second cross members has an identical cross sectional size.

13. A frame according to claim 1, wherein a forward portion of said second member is upwardly angled from horizontal.

14. A frame according to claim 13, wherein said forward portion is bent at an angle between 0° and 17° from horizontal.

15. A frame according to claim 14, wherein said forward portion is bent at an angle of about 8° from horizontal.

16. A frame according to claim 1, further comprising a plurality of laterally extending connecting members extending generally outwardly from and fixedly mounted to one of said first and second frame members.

17. A frame according to claim 1, wherein one of said first and second frame members is bent toward the other of said first and second frame members proximate one end thereof to thereby provide one of said first and second cross members.

18. A frame according to claim 1, wherein a rearward portion of said second frame member is bent generally upwardly and abuts and connects to a portion of said first member, thereby forming at least one of said first and second cross members.

19. A frame according to claim 1 further comprising a rear suspension mounting structure rigidly mounted to one of said first and second outboard wheel suspension mounting points.

20. A frame according to claim 1, wherein said first frame member includes a plurality of body mounting structures connected thereto, each of said plurality of body mounting structures forming body mounting portions thereon.

21. A frame according to claim 1, wherein each of the first and the second frame members consists essentially of a single beam.

22. A frame according to claim 1, wherein each of the first and second frame members and the forward and rearward cross members consists essentially of a single beam.

23. An ATV comprising:
an engine;
at least three wheel assemblies, at least one of the at least three wheel assemblies being powered by said engine;
a steering system operatively coupled to at least one of said at least three wheel assemblies;
a suspension system operatively coupled to each of said wheel assemblies; and
a frame comprising
  an upper frame member,
  a lower frame member,
  at least a forward cross member and a rearward cross member extending between said upper and lower frame members to thereby define a closed perimeter with an engine receiving space therein, and
  first and second outboard wheel suspension mounting points associated with at least one of the upper frame member, the lower frame member, the forward cross member, and the rearward cross member,
  wherein at least one of the upper frame member and the lower frame member is positioned substantially along a longitudinal centerline of the frame and extends from the first outboard wheel suspension mounting point to the second outboard wheel suspension mounting point,
  wherein one of the first and second mounting points is constructed and arranged to position at least one front wheel at a longitudinal position where the at least one front wheel defines an axis of rotation, when being steered straight ahead, that is positioned rearward of a forwardmost portion of the frame, and
  wherein at least one of the upper and lower frame members consists essentially of a single beam.

24. An ATV according to claim 23, wherein the upper and lower frame members define forwardmost and rearwardmost portions, and at least one of the first and second outboard wheel suspension mounting points is structured to define a wheel rotation axis positioned between the forwardmost and rearwardmost portions.

25. An ATV according to claim 23, wherein said single beam comprises a closed tubular structure.

26. An ATV according to claim 23, wherein each of the upper and lower frame members consists essentially of a single beam.

27. An ATV according to claim 26, wherein each of the forward and rearward cross members consists essentially of a single beam.

28. An ATV according to claim 23, wherein at least one of the first and second outboard wheel suspension mounting points is on a surface of one of the upper and lower frame members.

29. An ATV according to claim 23, wherein a ratio of a sectional width to a sectional height of each of the upper frame member, the lower frame member, the forward cross member, and the rearward cross member is greater than one.

30. An ATV according to claim 29, wherein each of said upper and lower frame members and said forward and rearward cross members has an oval cross section, said sectional width being a major axis of said oval cross section and said sectional height being a minor axis of said oval cross section.

31. An AIV according to claim 29, wherein each of said upper and lower frame members and said forward and rearward cross members has an elliptical cross section, said sectional width being a major axis of said elliptical cross section and said sectional height being a minor axis of said elliptical cross section.

32. An ATV according to claim 29, wherein said upper frame member is vertically aligned with said lower member.

33. An ATV according to claim 29, wherein each of said upper and lower frame members and said forward and rearward cross members has a uniform cross section throughout a length thereof.

34. An ATV according to claim 29, wherein each of said upper and lower frame members and said forward and rearward cross members has an identical cross sectional shape.

35. An ATV according to claim 29, wherein each of said upper and lower frame members and said forward and rearward cross members has an identical cross sectional size.

36. An ATV according to claim 29, wherein a forward portion of said lower frame member is bent upwardly from horizontal.

37. An ATV according to claim 36, wherein said forward portion is bent at an angle between 0° and 17° from horizontal.

38. An ATV according to claim 37, wherein said forward portion is bent at an angle of about 8° from horizontal.

39. An ATV according to claim 29, further comprising a plurality of laterally extending connecting members extending generally outwardly from and fixedly mounted to said upper member.

40. An ATV according to claim 39, wherein one of said upper and lower frame members is bent toward the other of said upper and lower frame members proximate one end thereof to thereby provide one of said forward and rearward cross members.

41. An ATV according to claim 29, wherein a rearward portion of said lower frame member is bent generally upwardly and abuts and connects to a rearward portion of said upper frame member, thereby forming said rearward cross member.

42. An ATV according to claim 29, further comprising a rear suspension mounting structure rigidly mounted to at least one of said first and second outboard wheel suspension mounting points.

43. An ATV according to claim 29, wherein said upper frame member includes a plurality of body mounting structures connected thereto, each of said plurality of body mounting structures forming body mounting portions thereon.

44. An ATV according to claim 29, wherein said suspension system includes a forward suspension subsystem and a rearward suspension subsystem mounted to said first and second outboard wheel suspension mounting points, respectively.

45. An ATV according to claim 44, wherein at least one of said forward and rearward suspension subsystems is fully-independent.

46. An ATV according to claim 44, wherein at least one of said forward and rearward suspension subsystems is semi-independent.

47. An ATV according to claim 44, wherein at least one of said forward and rearward suspension subsystems is non-independent.

48. An ATV according to claim 44, wherein at least one of said forward and rearward suspension subsystems is connectable with said lower frame member.

49. An ATV according to claim 48, wherein said at least one of said forward and rearward suspension subsystems is connected to an exterior surface of said lower member.

50. A frame for an ATV, said frame comprising:
a support module with a central opening, said support module including first and second longitudinal frame members interconnected by forward and rearward cross members; and
first and second outboard wheel suspension mounting points associated with at least one of the first and second longitudinal frame members;
wherein each of the first and second frame members consists essentially of a single beam, and
wherein one of the first and second outboard wheel suspension mounting points is constructed and arranged to position a front pair of wheels at a longitudinal positron where the front pair of wheels define an axis of rotation, when being steered straight ahead, that is positioned rearward of a forward most portion of the support module.

51. A frame according to claim 50, wherein each of the forward and rearward cross members consists essentially of a single beam.

52. A frame according to claim 50, wherein said single beam comprises a closed tubular structure.

53. A frame according to claim 50, wherein at least one of the first and second frame members extends from the first outboard wheel suspension mounting point to the second outboard wheel suspension mounting point.

54. A frame according to claim 53, wherein at least one of the first and second outboard wheel suspension mounting points is on a surface of one of the first and second frame members.

55. A frame according to claim 53, further comprising a swing arm mounting structure rigidly mounted to one of said first and second outboard wheel suspension mounting points to be within said central opening adjacent said second cross member and said second frame member.

56. A frame according to claim 55, wherein said swing arm mounting structure provides an engine mounting portion.

57. A frame according to claim 50, wherein each of said first and second frame members and first and second cross members has a sectional profile with a first sectional dimension thereof greater than a second sectional dimension thereof, said second sectional dimension being normal to said first sectional dimension.

58. A frame according to claim 57, wherein said first is major axis of an ellipsoidal sectional profile and said second sectional dimension is a minor axis of said ellipsoidal sectional profile.

59. A frame according to claim 50, wherein one of said first and second frame members is bent toward the other of said first and second frame members proximate one end thereof to thereby provide one of said first and second cross members.

60. A frame according to claim 50, wherein said first frame member is disposed above and in aligned relation to said second frame member.

61. A frame according to claim 50, wherein a forward portion of said second frame member forward of said support module is bent upwardly from horizontal.

62. A frame according to claim 61, wherein said forward portion is bent at an angle between 0° and 17° from horizontal.

63. A frame according to claim 62, wherein said forward portion is bent at an angle of about 8° from horizontal.

64. A frame according to claim 50, further comprising a plurality of laterally extending connecting members extending generally outwardly from and fixedly mounted to said first frame member.

65. A frame according to claim 50, further comprising a pair of opposing horizontally transversely extending rider support structures mounted and extending outwardly from respective sides of said second frame member, said rider support structures being constructed and arranged to provide upwardly facing rider support surfaces thereon.

66. A frame according to claim 50, wherein said first frame member is shaped to form a generally downwardly extending trough portion at a central region thereof, said trough portion being configured and positioned to be closer to said second frame member than regions of said first frame member immediately forward and rearward of said trough portion.

67. A frame according to claim 50, wherein a forward portion of said first frame member is bent generally downwardly and abuts and connects to said second frame member to form said first cross member.

68. A frame according to claim 50, further comprising a support structure rearward of said support module extending between said first and second frame members and being connected at respective ends thereto.

69. A frame according to claim 50, wherein a rearward portion of said second frame member is bent generally upwardly and abuts and connects to a rearward portion of said first frame member, thereby forming said second cross member.

70. A frame according to claim 50, wherein said first frame member includes a plurality of body mounting structures connected thereto, each of said plurality of body mounting structures defining body mounting portions thereon.

71. A frame according to claim 50, wherein at least one of the first and second outboard wheel suspension mounting points includes a pivot axis substantially parallel to at least one of the first and second longitudinal frame members.

72. An ATV comprising:
an engine;
at least three wheel assemblies, at least one of the at least three wheel assemblies being powered by the engine;
a steering system operatively coupled to at least one of said at least three wheel assemblies;
a suspension system operatively coupled to each of said wheel assemblies; and
a frame comprising
a support module with a central opening for receiving the engine, said support module including upper and lower longitudinal frame members interconnected by forward and rearward cross members, and
first and second outboard wheel suspension mounting points provided to at least one of the upper and lower longitudinal frame members,
wherein each of the upper and lower frame members consists essentially of a single beam, and
wherein one of the first and second mounting points is constructed and arranged to position at least one front wheel at a longitudinal position where the at least one front wheel defines an axis of rotation, when being steered straight ahead, that is positioned rearward of a forwardmost portion of the frame.

73. An ATV according to claim 72, wherein each of the forward and rearward cross members consists essentially of a single beam.

74. An ATV according to claim 72, wherein said single beam comprises a closed tubular structure.

75. An ATV according to claim 72, wherein at least one of the upper and lower frame members extends from the first outboard wheel suspension mounting point to the second outboard wheel suspension mounting point.

76. An ATV according to claim 75, wherein at least one of the first and second outboard wheel suspension mounting points is on a surface of one of the first and second frame members.

77. An ATV according to claim 72, wherein at least one of said upper and lower frame members and forward and rearward cross members having a sectional profile with a first sectional dimension thereof greater than a second sectional dimension thereof, said second sectional dimension being normal to said first sectional dimension.

78. An ATV according to claim 72, wherein said engine is disposed within said central opening of said support module and is connectable with at least one of said lower frame member, said upper frame member, said forward cross member, and said rearward cross member.

79. An ATV according to claim 72, wherein one of said upper and lower members is bent toward the other of said upper and lower members proximate one end thereof to thereby provide one of said forward and rearward cross members.

80. An ATV according to claim 72, wherein said upper frame member is disposed above and in aligned relation to said lower frame member.

81. An ATV according to claim 72, wherein a portion of said lower frame member forward of said support module is bent upwardly from horizontal.

82. An ATV according to claim 81, wherein said portion of said lower frame member forward of said support module is bent at an angle between 0° and 17° from horizontal.

83. An ATV according to claim 82, wherein said portion of said lower frame member forward of said support module is bent at an angle of about 8° from horizontal.

84. An ATV according to claim 72, further comprising a plurality of laterally extending connecting members extending generally outwardly from and fixedly mounted to said upper frame member.

85. An ATV according to claim 72, further comprising a pair of opposing horizontally transversely extending rider support structures mounted and extending outwardly from respective sides of said lower frame member, said rider support structures being constructed and arranged to provide upwardly facing rider support surfaces thereon.

86. An ATV according to claim 72, wherein said upper frame member forms a generally downwardly extending trough portion at a central region thereof, said trough portion being configured and positioned to be closer to said lower frame member than regions of said upper member immediately forward and rearward of said trough portion.

87. An ATV according to claim 72, wherein a forward portion of said upper frame member is bent generally downwardly and abuts and connects to said lower frame member to form said forward cross member.

88. An ATV according to claim 72, further comprising a support module rearward of said support module extending between said upper and lower frame members and being connected at respective ends thereto.

89. An ATV according to claim 72, further comprising a drive system that includes a rear differential mountable to said support module, said rear differential being operatively coupled to said engine via a driveshaft extending therebetween.

90. An ATV according to claim 89, wherein said rearward cross member defines a horizontally extending opening therein, said driveshaft extending there through.

91. An ATV according to claim 72, wherein said suspension system includes a rear suspension pivot structure mounted to one of said first and second outboard wheel suspension mounting points adjacent said rearward cross member to be disposed within said central opening of said support module.

92. An ATV according to claim 91, wherein said suspension system further includes a pair of rearward trailing arms, one end of each of said trailing arms being pivotably connectable with said rear suspension pivot structure, each of said trailing arms extending generally rearwardly from said one end, a second end opposite said one end of each trailing arm being connected to a respective one of said wheel assemblies.

93. An ATV according to claim 72, wherein said suspension system includes:
   a plurality of a-arm connecting structures mounted to a forward portion of said lower member;
   a pair of a-arms, each of said pair of a-arms having an end portion pivotably connected to respective a-arm connecting structures of said plurality of a-arm connecting structures, each of said pair of a-arms extending laterally outwardly from said respective a-arm connecting structures, each of said pair of a-arms having a second end portion connected with a respective one of said wheel assemblies.

94. An ATV according to claim 72, wherein a rearward portion of said lower frame member is bent generally upwardly and abuts and connects to a rearward portion of said upper frame member, thereby forming said rearward cross member.

95. An ATV according to claim 72, wherein said suspension system includes a swing arm mounting structure rigidly mounted to said support module within said central opening adjacent said rearward cross member and said lower frame member.

96. An ATV according to claim 95, wherein said suspension system includes a rear swing arm pivotably connectable with said swing arm mounting structure.

97. An ATV according to claim 96, wherein said swing arm mounting structure provides an engine mounting portion, said engine being mountable with said engine mounting portion.

98. An ATV according to claim 72, wherein said upper frame member includes a plurality of body mounting structures connected thereto, each of said plurality of body mounting structures defining body mounting portions thereon.

99. An ATV according to claim 72, wherein said suspension system includes:
   a plurality of a-arm connecting structures mounted to a forward portion of said lower member;
   a pair of a-arms, each of said pair of a-arms having an end portion pivotably connected to respective a-arm connecting structures of said plurality of a-arm connecting structures, each of said pair of a-arms extending laterally outwardly from said respective a-arm connecting structures, each of said pair of a-arms having a second end portion connected with a respective one of said wheel assemblies.

100. An ATV according to claim 72, wherein each of said first and second frame members and said first and second cross members has an ellipsoidal sectional profile with a first sectional dimension thereof that is greater than a second sectional dimension thereof, said second sectional dimension being normal to said first sectional dimension, said first sectional dimension being a major axis of said ellipsoidal sectional profile and said second sectional dimension being a minor axis of said ellipsoidal sectional profile.

101. An ATV according to claim 72, wherein said suspension system includes a forward suspension subsystem and a rearward suspension subsystem.

102. An ATV according to claim 101, wherein at least one of said forward and rearward suspension subsystems is fully-independent.

103. An ATV according to claim 101, wherein at least one of said forward and rearward suspension subsystems is semi-independent.

104. An ATV according to claim 101, wherein at least one of said forward and rearward suspension subsystems is non-independent.

105. An ATV according to claim 101, wherein at least one of said forward and rearward suspension subsystems is connectable with said lower frame member.

106. An ATV according to claim 101, wherein said at least one of said forward and rearward suspension subsystems is connected to an exterior surface of said lower frame member.

107. An ATV according to claim 72, wherein said upper frame member defines a generally vertically extending steering column-receiving opening there through, said steering system including a steering structure disposed above said upper frame member and connected to a steering column, said steering column extending from said steering structure through said steering column-receiving opening to be connectable with said pair of forward wheel assemblies.

108. An ATV according to claim 72, wherein at least one of the first and second outboard wheel suspension mounting points includes a pivot axis substantially parallel to at least one of the upper and lower longitudinal frame members.

109. An ATV comprising:
   a frame including at least an upper member and a lower member interconnected with the upper member to define an engine receiving space therebetween, at least one of the upper member and the lower member consisting essentially of a single beam having a surface with a plurality of suspension mounting points;
   at least a front outboard wheel assembly and a rear outboard wheel assembly being suspended from said wheel suspension mounting points provided on said surface of one of said upper member and said lower member of the frame; and an engine provided in said engine receiving space for powering at least one of said wheel assemblies, wherein the front outboard wheel assembly is provided to the lower frame member to thereby define an axis of rotation of at least one front wheel, when the ATV is being steered straight ahead, that is positioned rearward of a forwardmost portion of the frame.

110. An ATV according to claim 109, wherein each of the upper and lower members consists essentially of a single beam.

111. An ATV according to claim 110, further comprising at least one cross member connecting the upper and lower members, the at least one cross member consisting essentially of a single beam.

112. An ATV according to claim 109, wherein at least one of the plurality of outboard wheel suspension mounting points includes a pivot axis which is substantially longitudinal.

113. A frame for an ATV comprising:

at least an upper member and a lower member interconnected to the upper member to define an engine receiving space therebetween, at least one of the upper member and the lower member consisting essentially of a single beam having a surface; and an outboard wheel suspension mounting point for a corresponding outboard front wheel assembly, the outboard wheel suspension mounting point being provided on the surface of one of the upper member and the lower member and being constructed and arranged to position a front pair of wheels at a longitudinal position where the front pair of wheels define an axis of rotation, when being steered straight ahead, that is positioned rearward of a forwardmost portion of the frame.

114. A frame according to claim 113, wherein the at least one outboard wheel suspension mounting point includes a pivot axis which is substantially longitudinal.

115. An ATV comprising:

an engine;

a plurality of outboard wheel assemblies, including at least front and rear pairs of wheel assemblies, at least one of the pairs of wheel assemblies being powered by the engine;

a suspension system operatively coupled to each of said wheel assemblies; and a frame, said frame including:

a support module with a central opening for receiving the engine, said support module including an upper frame member and a lower frame member connected to the upper frame member, at least a portion of the support module comprising one of the upper and lower frame members that includes only a single closed tubular frame member, wherein at least the front pair of wheel assemblies is provided to the lower frame member to thereby define an axis of rotation for the wheels, when being steered straight ahead, that is positioned rearward of a forwardmost portion of the support module.

116. An ATV according to claim 115, wherein each of the upper and lower members consists essentially of a single beam.

117. An ATV according to claim 116, further comprising at least one cross member connecting the upper and lower members, the at least one cross member consisting essentially of a single beam.

118. An ATV according to claim 115, wherein at least one of said upper and lower frame members has a sectional profile with a first dimension thereof greater than a second dimension thereof, said second dimension being normal to said first dimension.

119. An ATV according to claim 115, wherein each of the upper and lower frame members has a sectional profile with a first dimension thereof greater than a second dimension thereof, said second dimension being normal to said first dimension.

120. A frame for an ATV comprising:

a support module with a central opening defining an engine receiving space, said support module including a first frame member and a second frame member connected to the first frame member, at least a portion of the support module comprising one of the first and second frame members that includes only a single closed tubular frame member, and a plurality of outboard wheel suspension mounting points associated with the support module, wherein one of the first and second outboard wheel suspension mounting points is constructed and arranged to position a front pair of wheels at a longitudinal position where the front pair of wheels define an axis of rotation, when being steered straight ahead, that is positioned rearward of a forwardmost portion of the support module.

121. A frame according to claim 120, wherein at least one of said first and second frame members has a sectional profile with a first dimension thereof greater than a second dimension thereof, said second dimension being normal to said first dimension.

122. A frame according to claim 120, wherein each of the first and second frame members has a sectional profile with a first dimension thereof greater than a second dimension thereof, said second dimension being normal to said first dimension.

123. A frame for an ATV comprising:

a first frame member;

a second frame member;

at least a first cross member and a second cross member extending between said first and second frame members to thereby define a closed perimeter with an engine receiving space therein; and first and second outboard wheel suspension mounting points associated with at least one of the first frame member, the second frame member, the first cross member, and the second cross member, wherein a ratio of a sectional width to a sectional height of each of the first member, the second member, the first cross member, and the second cross member is greater than one, and wherein one of the first and second outboard wheel suspension mounting points is constructed and arranged to position a front pair of wheels at a longitudinal position where the front pair of wheels define an axis of rotation, when being steered straight ahead, that is positioned rearward of a forwardmost portion of the frame.

124. A frame for an ATV comprising:

a first frame member;

a second frame member; and at least one cross member extending between said first and second frame members to thereby define an engine receiving space therein, wherein at least one of the first frame member, the second frame member, and the at least one cross member comprises only a single closed tubular structure, and a plurality of outboard wheel suspension mounting points associated with the closed tubular structure, at least one of the plurality of outboard wheel suspension mounting points being constructed and arranged to position a front pair of wheels at a longitudinal position where the front pair of wheels define an axis of rotation, when being steered straight ahead, that is positioned rearward of a forwardmost portion of the frame.

* * * * *